United States Patent
Mishra et al.

(10) Patent No.: US 10,467,154 B2
(45) Date of Patent: Nov. 5, 2019

(54) MULTI-PORT MULTI-SIDEBAND-GPIO CONSOLIDATION TECHNIQUE OVER A MULTI-DROP SERIAL BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Christopher Kong Yee Chun, Austin, TX (US); Mohit Prasad, San Diego, CA (US); Chris Rosolowski, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/864,871

(22) Filed: Jan. 8, 2018

(65) Prior Publication Data
US 2018/0232324 A1   Aug. 16, 2018

Related U.S. Application Data

(60) Provisional application No. 62/457,729, filed on Feb. 10, 2017.

(51) Int. Cl.
| | |
|---|---|
| *G06F 13/12* | (2006.01) |
| *G06F 13/364* | (2006.01) |
| *G06F 13/40* | (2006.01) |
| *G06F 13/42* | (2006.01) |
| *G06F 15/78* | (2006.01) |

(52) U.S. Cl.
CPC .......... *G06F 13/126* (2013.01); *G06F 13/364* (2013.01); *G06F 13/404* (2013.01); *G06F 13/4282* (2013.01); *G06F 15/7817* (2013.01)

(58) Field of Classification Search
None
See application file for complete search history.

(56) References Cited

U.S. PATENT DOCUMENTS

| | | | |
|---|---|---|---|
| 7,934,034 B2 | 4/2011 | Deshpande et al. | |
| 8,935,453 B2 | 1/2015 | Debendra | |
| 9,563,398 B2* | 2/2017 | Mishra | G06F 5/065 |
| 9,619,427 B2* | 4/2017 | Mishra | G06F 9/4498 |
| 9,720,865 B1 | 8/2017 | Williams et al. | |
| 10,241,953 B2* | 3/2019 | Mishra | G06F 13/4282 |
| 2009/0150655 A1 | 6/2009 | Kim | |
| 2017/0039162 A1* | 2/2017 | Mishra | G06F 13/4282 |
| 2017/0075852 A1* | 3/2017 | Mishra | G06F 13/4282 |

(Continued)

OTHER PUBLICATIONS

International Search Report and Written Opinion—PCT/US2018/012900—ISA/EPO—dated Apr. 5, 2018.

*Primary Examiner* — Michael Sun
(74) *Attorney, Agent, or Firm* — Loza & Loza LLP

(57) ABSTRACT

Systems, methods, and apparatus for communication virtualized general-purpose input/output signals over a serial communication link A method performed at a transmitting device coupled to a communication link includes configuring general-purpose input/output (GPIO) state from a plurality of sources into a virtual general-purpose input/output word, identifying one or more destinations for the first GPIO word based on a mapping of the GPIO state to one or more devices coupled to a serial bus, and transmitting the first GPIO word to each destination.

31 Claims, 20 Drawing Sheets

(56) References Cited

U.S. PATENT DOCUMENTS

| | | |
|---|---|---|
| 2017/0168966 A1 | 6/2017 | Mishra et al. |
| 2018/0329856 A1* | 11/2018 | Mishra ................ G06F 13/4282 |
| 2019/0050366 A1* | 2/2019 | Mishra ................ G06F 13/4282 |
| 2019/0129881 A1* | 5/2019 | Wietfeldt ............ G06F 13/4068 |

* cited by examiner

MULTI-PORT MULTI-SIDEBAND-GPIO CONSOLIDATION TECHNIQUE OVER A MULTI-DROP SERIAL BUS

PRIORITY CLAIM

This application claims priority to and the benefit of provisional patent application No. 62/457,729 filed in the United States Patent Office on Feb. 10, 2017, the entire content of which is incorporated herein by reference as if fully set forth below in its entirety and for all applicable purposes

TECHNICAL FIELD

The present disclosure relates generally to serial communication and input/output pin configuration and, more particularly, to optimizing a finite state machine configured for optimal latency for serial messaging and input/output pin configuration.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bur or a parallel bus. General-purpose serial interfaces known in the industry, including the Inter-Integrated Circuit (I2C or I$^2$C) serial bus and its derivatives and alternatives, including interfaces defined by the Mobile Industry Processor Interface (MIPI) Alliance, such as I3C and the Radio Frequency Front-End (RFFE) interface.

In one example, the I2C serial bus is a serial single-ended computer bus that was intended for use in connecting low-speed peripherals to a processor. Some interfaces provide multi-master busses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can provide optimized low-latency communications between different devices such that GPIO signals may be carried as virtual signals. A virtual GPIO finite state machine (VGI FSM) is provided that can consolidate GPIO state information from multiple sources and distribute the state information to one or more devices over a data communication bus.

In various aspects of the disclosure, a method performed at a transmitting device includes configuring GPIO state from a plurality of sources into a virtual GPIO (VGI) word, identifying one or more destinations for the VGI word based on a mapping of the GPIO state to one or more devices coupled to a shared communication link, and transmitting the VGI word to each destination over the shared communication link.

In one aspect, the mapping associates each bit of the VGI word with one or more devices that includes a GPIO pin corresponding to a GPIO in a source of the each bit. Each receiving device of the VGI word masks the of the VGI word in accordance with a masking table that identifies GPIO state information in the VGI word affecting a GPIO pin in the each receiving device. The plurality of sources includes GPIO associated with two or more communication links. The plurality of sources includes GPIO associated with two or more devices.

In some aspects, the VGI word is transmitted in a data packet in accordance with a system power management interface (SPMI) protocol. The VGI word may be transmitted in the data packet to a first destination through a first SPMI interface of an intermediate device. The intermediate device relays the data packet to the first destination through a second SPMI interface of the intermediate device.

In one aspect, the VGI word is transmitted in a data packet in accordance with a radio frequency front-end (RFFE) protocol.

In various aspects, an apparatus has a bus interface configured to couple the apparatus to a serial bus, and a virtual general-purpose input/output finite state machine configured to map GPIO state from a plurality of sources into a VGI word, identify one or more destinations for VGI word based on a mapping of the GPIO state to one or more devices coupled to a shared communication link, and transmit the VGI word through the bus interface to at least one destination.

In various aspects of the disclosure, a method performed at a receiving device includes receiving a VGI word from a shared communication link, masking the VGI word to obtain a set of VGI bits that excludes at least one bit, mapping the set of VGI bits to a corresponding set of physical GPIO pins, and cause each of the set of physical GPIO pins to have a signaling state defined by a corresponding VGI bit in the set of VGI bits. The VGI word may be received by a plurality of devices. The signaling state of at least one physical GPIO pin in each of the plurality of devices may be defined by a corresponding bit in the VGI word.

In one aspect, masking the at least one bit of the VGI word includes masking the VGI word in accordance with a masking table that identifies state information in the VGI word affecting one or more physical GPIO pins in the receiving device. The state information defined by the VGI word may include state information associated with two or more communication links. The shared communication link may be operated in accordance with a SPMI protocol or a radio frequency front-end (RFFE) protocol.

In various aspects of the disclosure, an apparatus has a bus interface configured to receive a virtual general-purpose input/output (VGI) word from a serial bus, a masking circuit configured to extract one or more VGI bits from the VGI word, and a virtual general-purpose input/output finite state machine configured to map the one or more VGI bits to a corresponding set of physical GPIO pins, and cause each of the set of physical GPIO pins to have a signaling state defined by a corresponding VGI bit in the one or more VGI bits. The masking circuit may be configured to mask the VGI word in accordance with a masking table that identifies state information in the VGI word affecting one or more physical GPIO pins in the receiving device.

DETAILED DESCRIPTION

Figure 1:
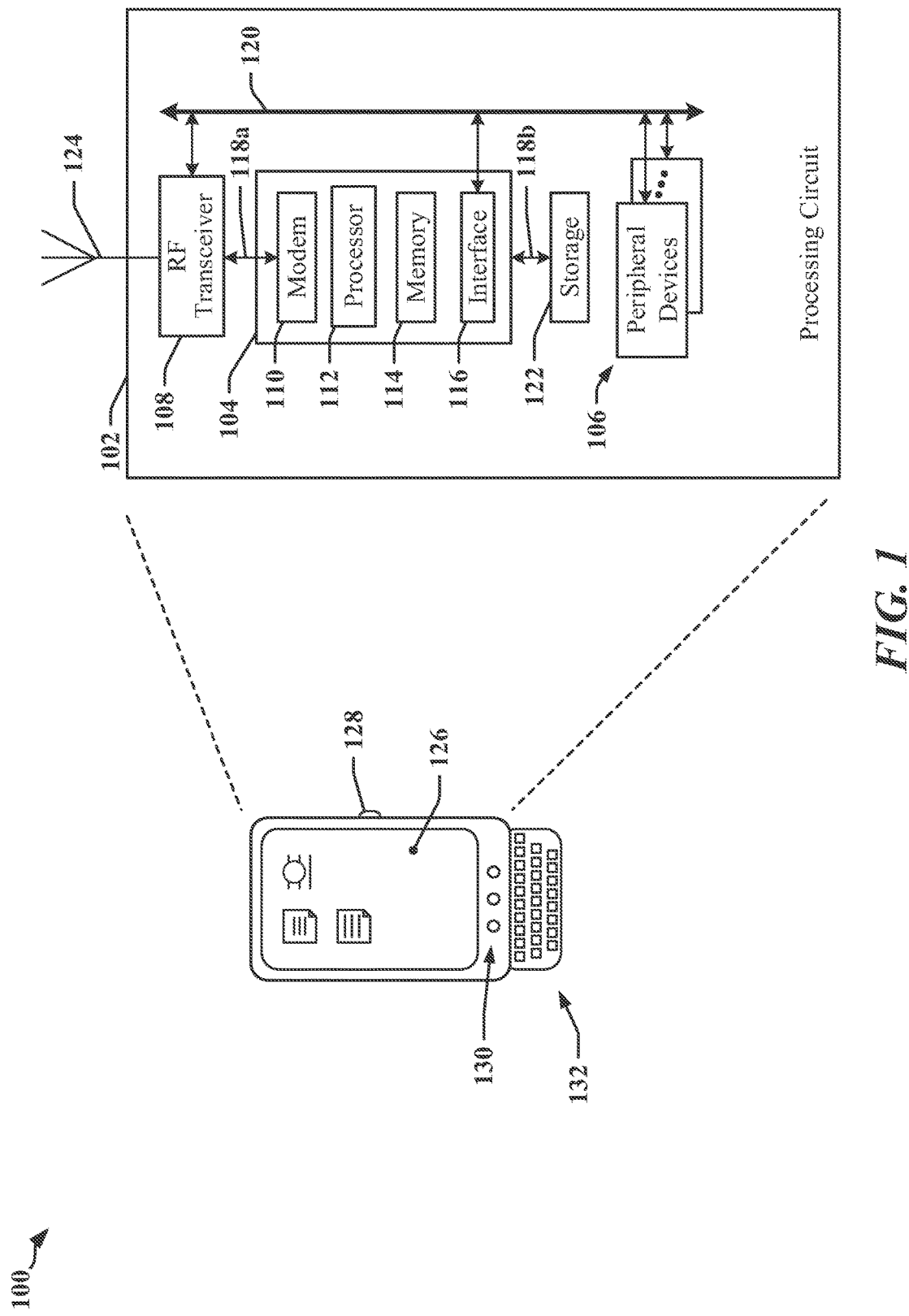
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance I2C, I3C, and/or RFFE protocols. According to certain aspects disclosed herein, GPIO pins and signals may be virtualized into GPIO state information that may be transmitted over a data communication link Virtualized GPIO state information that may be transmitted over a variety of communication links, including links that include wired and RF communication links. For example, virtualized GPIO state information can be packetized or otherwise formatted for transmission over RF networks including Bluetooth, WLAN, cellular networks, etc. Examples involving wired communication links are described herein to facilitate understanding of certain aspects. These aspects invariably apply to implementations in which transmission of GPIO state information includes transmission over RF networks.

A number of different protocol schemes may be used for communicating messaging and data over communication links Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines must be met. In certain real-time applications, meeting transmission deadlines is of paramount importance. When a common bus supports different protocols it is generally difficult or impossible to guarantee optimal latency under all use cases. In some examples, an I2C, I3C or RFFE SPMI serial communication bus may be used to tunnel different protocols with different latency requirements, different data transmission volumes and/or different transmission schedules.

Certain aspects disclosed herein provide methods, circuits and systems that are adapted to enable a device to consolidate GPIO state information for multiple interfaces connecting the device and to one or more other devices. The consolidated GPIO state information can be addressed to specific devices or interfaces on other devices, and/or to groups of devices and/or interfaces.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
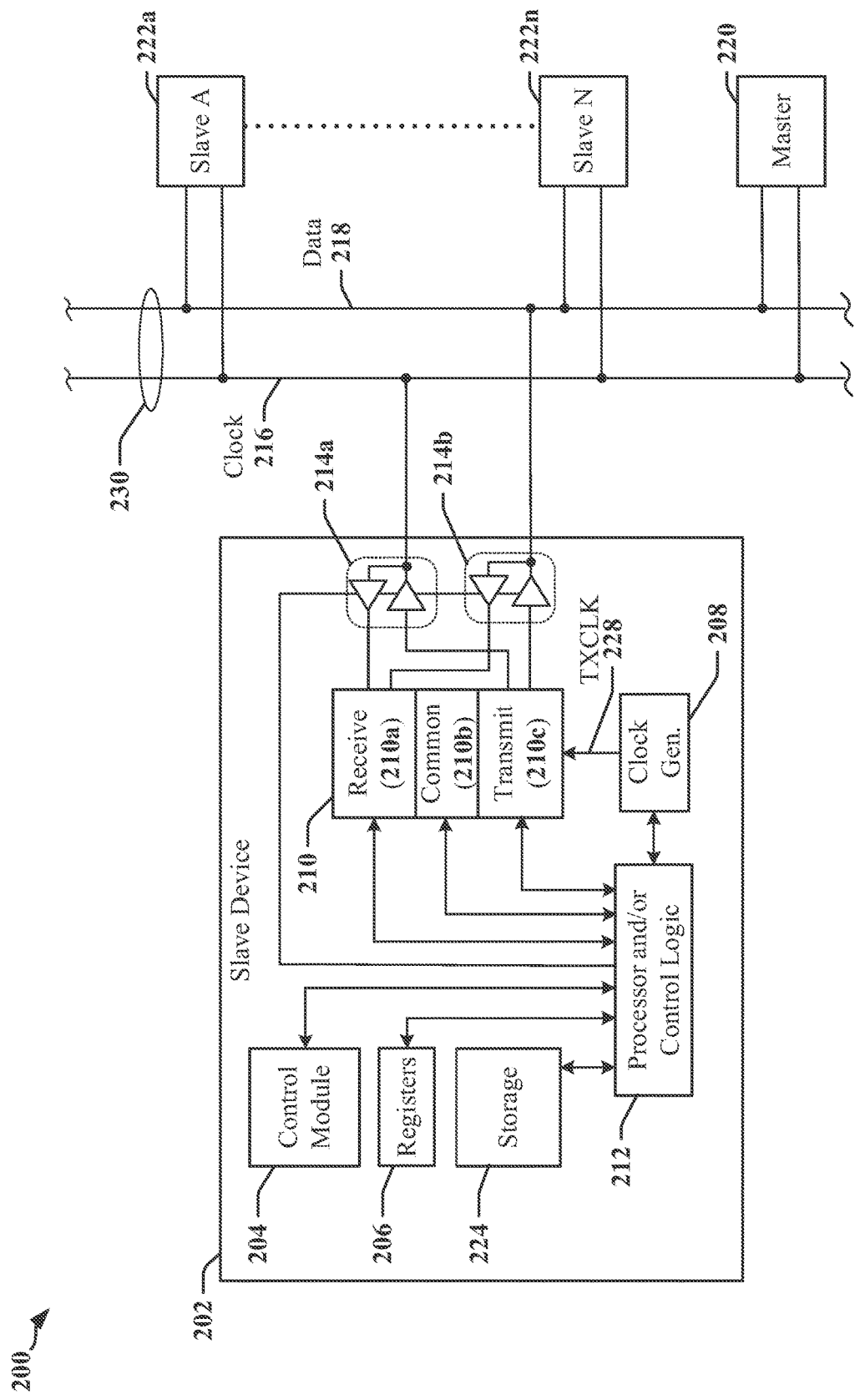
FIG. 2 illustrates a system architecture for an apparatus employing a data link between IC devices.

FIG. 2 illustrates certain aspects of an apparatus 200 that includes multiple devices 202, 220 and 222a-222n connected to a serial bus 230. The devices 202, 220 and 222a-222n may include one or more semiconductor IC devices, such as an applications processor, SoC or ASIC. Each of the devices 202, 220 and 222a-222n may include, support or operate as a modem, a signal processing device, a display driver, a camera, a user interface, a sensor, a sensor controller, a media player, a transceiver, and/or other such components or devices. Communications between devices 202, 220 and 222a-222n over the serial bus 230 is controlled by a bus master 220. Certain types of bus can support multiple bus masters 220.

The apparatus 200 may include multiple devices 202, 220 and 222a-222n that communicate when the serial bus 230 is operated in accordance with I2C, I3C or other protocols. At least one device 202, 222a-222n may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing in one or more signals 228 provided by a clock generation circuit 208.

Two or more of the devices 202, 220 and/or 222a-222n may be adapted according to certain aspects and features disclosed herein to support a plurality of different communication protocols over a common bus, which may include an I2C and/or I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216.

Figure 3:
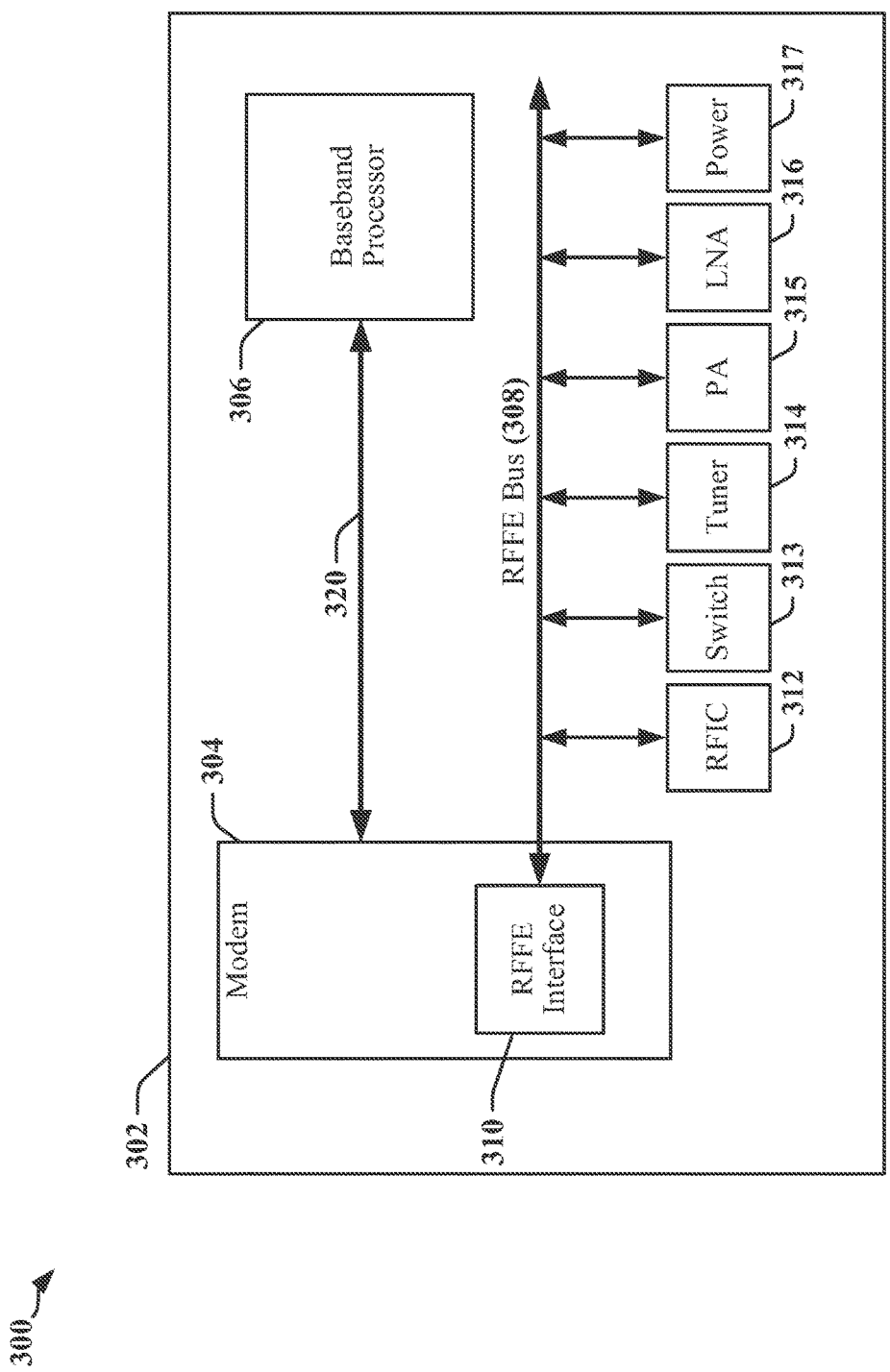
FIG. 3 illustrates a device that employs an RFFE bus to couple various radio frequency front-end devices.

FIG. 3 is a block diagram 300 illustrating an example of a device 302 that employs an RFFE bus 308 to couple various front-end devices 312-317. A modem 304 may include an RFFE interface 310 that couples the modem 304 to the RFFE bus 308. The modem 304 may communicate with a baseband processor 306. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 302 may be implemented with one or more baseband processors 306, modems 304, multiple communication links 308, 320, and various other busses, devices and/or different functionalities. In the example illustrated in FIG. 3, the RFFE bus 308 may be coupled to an RF integrated circuit (RFIC) 312, which may include one or more controllers, and/or processors that configure and control certain aspects of the RF front-end. The RFFE bus 308 may couple the RFIC 312 to a switch 313, an RF tuner 314, a power amplifier (PA) 315, a low noise amplifier (LNA) 316 and a power management module 317.

Figure 4:
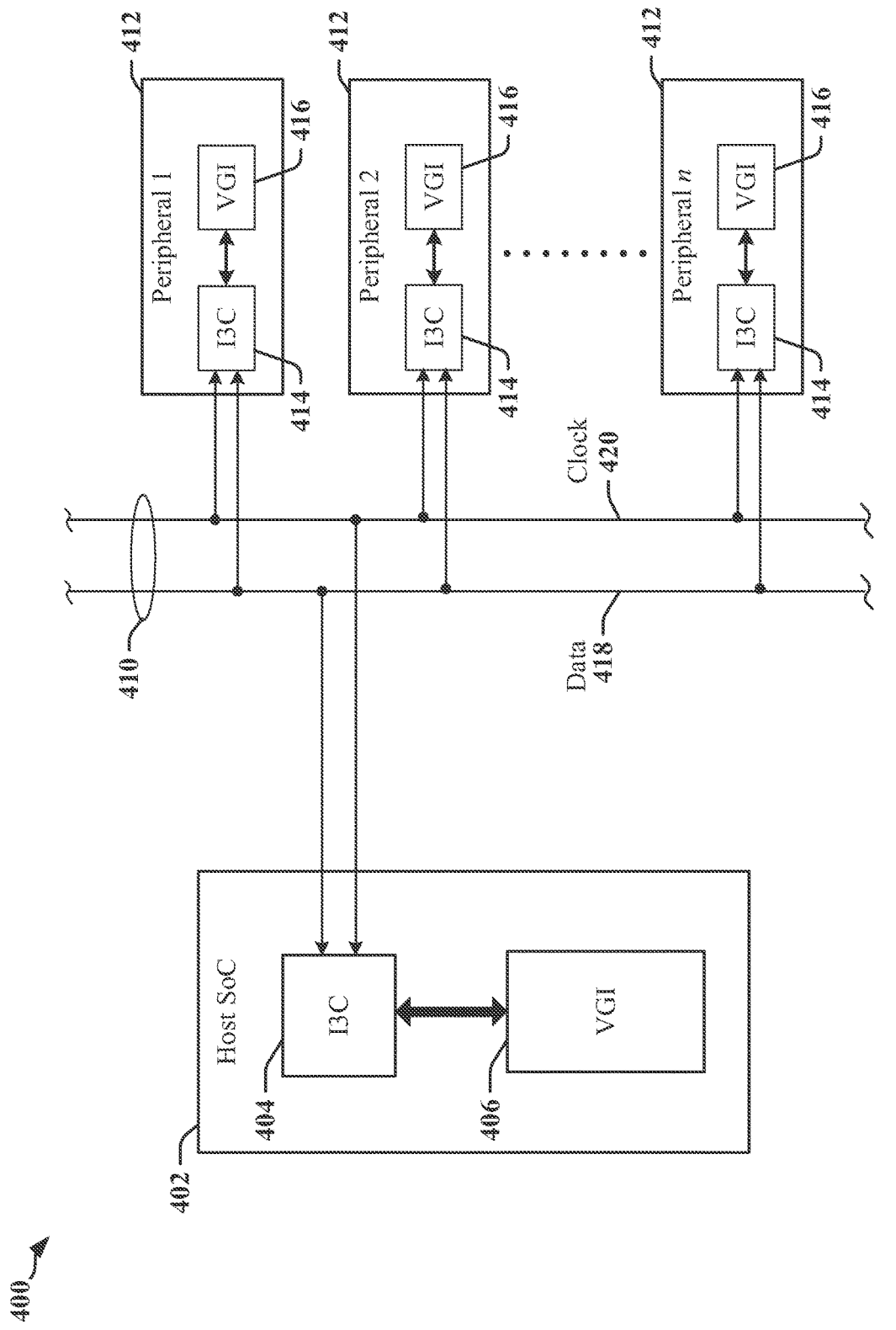
FIG. 4 illustrates a device that employs an I3C bus to couple various front-end devices in accordance with certain aspects disclosed herein.

FIG. 4 illustrates an example of an apparatus 400 that uses an I3C bus to couple various devices including a host SoC 402 and a number of peripheral devices 412. The host SoC 402 may include a virtual GPIO finite state machine (VGI FSM 406) and an I3C interface 404, where the I3C interface 404 cooperates with corresponding I3C interfaces 414 in the peripheral devices 412 to provide a communication link between the host SoC 402 and the peripheral devices 412. Each peripheral device 412 includes a VGI FSM 416. In the illustrated example, communications between the SoC 402 and a peripheral device 412 may be serialized and transmitted over a multi-wire serial bus 410 in accordance with an I3C protocol. In other examples, the host SoC 402 may include other types of interface, including I2C and/or RFFE interfaces. In other examples, the host SoC 402 may include a configurable interface that may be employed to communicate using I2C, I3C, RFFE and/or another suitable protocol. In some examples, a multi-wire serial bus 410, such as an I2C or I3C bus, may transmit a data signal over a data wire 418 and a clock signal over a clock wire 420.

Signaling Virtual GPIO Configuration Information

Figure 5:
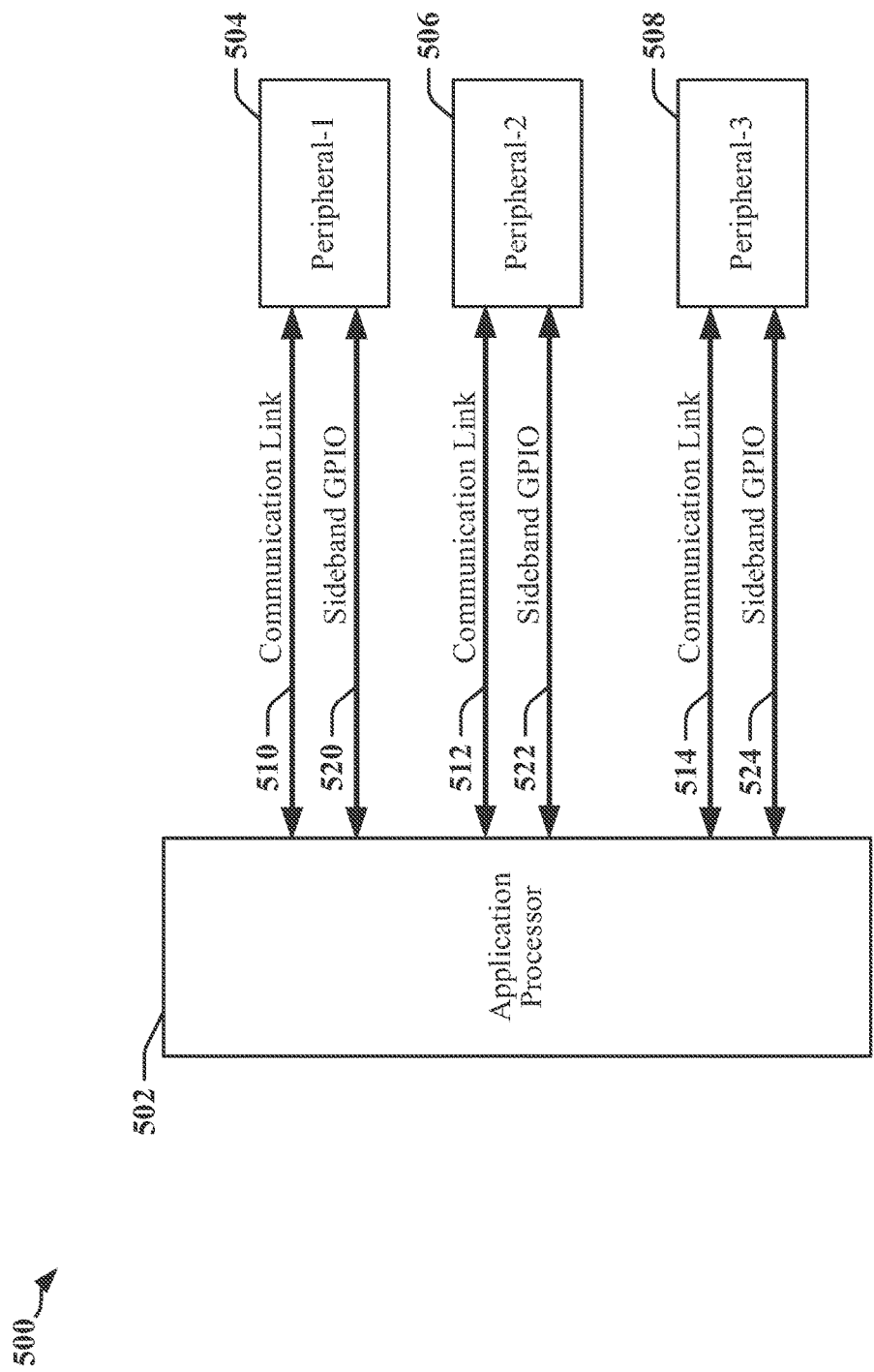
FIG. 5 illustrates an apparatus that includes an Application Processor and multiple peripheral devices that may be adapted according to certain aspects disclosed herein.

Mobile communication devices, and other devices that are related or connected to mobile communication devices, increasingly provide greater capabilities, performance and functionalities. In many instances, a mobile communication device incorporates multiple IC devices that are connected using a variety of communications links FIG. 5 illustrates an apparatus 500 that includes an Application Processor 502 and multiple peripheral devices 504, 506, 508. In the example, each peripheral device 504, 506, 508 communicates with the Application Processor 502 over a respective communication link 510, 512, 514 operated in accordance with mutually different protocols. Communication between the Application Processor 502 and each peripheral device 504, 506, 508 may involve additional wires that carry control or command signals between the Application Processor 502 and the peripheral devices 504, 506, 508. These additional wires may be referred to as sideband general purpose input/output (sideband GPIO 520, 522, 524), and in some instances the number of connections needed for sideband GPIO 520, 522, 524 can exceed the number of connections used for a communication link 510, 512, 514.

GPIO provides generic pins/connections that may be customized for particular applications. For example, a GPIO pin may be programmable to function as an output, input pin or a bidirectional pin, in accordance with application needs. In one example, the Application Processor 502 may assign and/or configure a number of GPIO pins to conduct handshake signaling or inter-processor communication (IPC) with a peripheral device 504, 506, 508 such as a modem. When handshake signaling is used, sideband signaling may be symmetric, where signaling is transmitted and received by the Application Processor 502 and a peripheral device 504, 506, 508. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, serialized and transmitted over a data communication link In one example, captured GPIO may be transmitted in packets over an I3C bus using common command codes to indicate packet content and/or destination.

Figure 6:
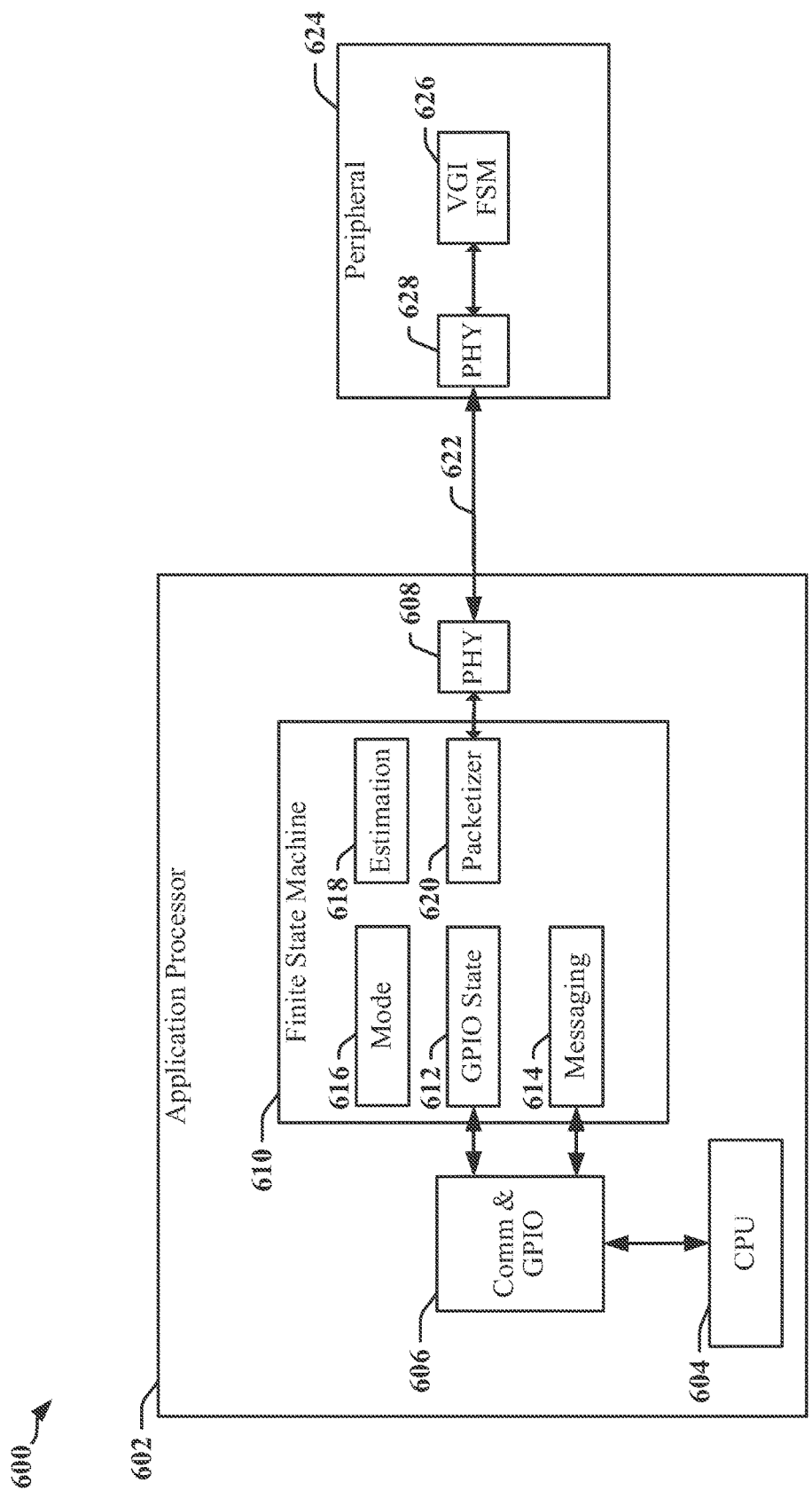
FIG. 6 illustrates an apparatus that has been adapted to support Virtual GPIO in accordance with certain aspects disclosed herein.

FIG. 6 illustrates an apparatus 600 that is adapted to support Virtual GPIO (VGI or VGMI) in accordance with certain aspects disclosed herein. VGI circuits and techniques can reduce the number of physical pins and connections used to connect an Application Processor 602 with a peripheral device 624. VGI enables a plurality of GPIO signals to be serialized into virtual GPIO signals that can be transmitted over a communication link 622. In one example, virtual GPIO signals may be encoded in packets that are transmitted over a communication link 622 that includes a multi-wire bus, including a serial bus. When the communication link 622 is provided as serial bus, the receiving peripheral device 624 may deserialize received packets and may extract messages and virtual GPIO signals. A VGI FSM 626 in the peripheral device 624 may convert the virtual GPIO signals to physical GPIO signals that can be presented at an internal GPIO interface.

In another example, the communication link 622 may be a provided by a radio frequency transceiver that supports RF communication using, for example, a Bluetooth protocol, a RF local area network (WLAN) protocol, a cellular wide area network, and/or another RF communication protocol. When the communication link 622 includes a RF connection, messages and virtual GPIO signals may be encoded in packets, frames, subframes, or other structures that can be transmitted over the communication link 622, and the receiving peripheral device 624 may extract, deserialize and otherwise process received signaling to obtain the messages and virtual GPIO signals. Upon receipt of messages and/or virtual GPIO signals, the VGI FSM 626 or another component of the receiving device may interrupt its host processor to indicate receipt of messages and/or any changes in in GPIO signals.

In an example in which the communication link 622 is provided as a serial bus, messages and/or virtual GPIO signals may be transmitted in packets configured for an I2C, I3C, RFFE or another standardized serial interface. In the illustrated example, VGI techniques are employed to accommodate I/O bridging between an Application Processor 602 and a peripheral device 624. The Application Processor 602 may be implemented as an ASIC, SoC or some combination of devices. The Application Processor 602 includes a processor (central processing unit or CPU 604) that generates messages and GPIO associated with one or more communications channels 606. GPIO signals and messages produced by the communications channels 606 may be monitored by respective monitoring circuits 612, 614 in a VGI FSM 626. In some examples, a GPIO monitoring circuit 612 may be adapted to produce virtual GPIO signals representative of the state of physical GPIO signals and/or changes in the state of the physical GPIO signals. In some examples, other circuits are provided to produce the virtual GPIO signals representative of the state of physical GPIO signals and/or changes in the state of the physical GPIO signals.

An estimation circuit 618 may be configured to estimate latency information for the GPIO signals and messages, and may select a protocol, and/or a mode of communication for the communication link 622 that optimizes the latency for encoding and transmitting the GPIO signals and messages. The estimation circuit 618 may maintain protocol and mode information 616 that characterizes certain aspects of the communication link 622 to be considered when selecting the protocol, and/or a mode of communication. The estimation circuit 618 may be further configured to select a packet type for encoding and transmitting the GPIO signals and messages. The estimation circuit 618 may provide configuration information used by a packetizer 620 to encode the GPIO signals and messages. In one example, the configuration information is provided as a command that may be encapsulated in a packet such that the type of packet can be determined at a receiver. The configuration information, which may be a command, may also be provided to physical layer circuits (PHY 608). The PHY 608 may use the configuration information to select a protocol and/or mode of communication for transmitting the associated packet. The PHY 608 may then generate the appropriate signaling to transmit the packet.

The peripheral device 624 may include a VGI FSM 626 that may be configured to process data packets received from the communication link 622. The VGI FSM 626 at the peripheral device 624 may extract messages and may map bit positions in virtual GPIO signals onto physical GPIO pins in the peripheral device 624. In certain embodiments, the communication link 622 is bidirectional, and both the Application Processor 602 and a peripheral device 624 may operate as both transmitter and receiver.

The PHY 608 in the Application Processor 602 and a corresponding PHY 628 in the peripheral device 624 may be configured to establish and operate the communication link 622. The PHY 608 and 628 may be coupled to, or include an RF transceiver 108 (see FIG. 1) that supports RF communications. In some examples, the PHY 608 and 628 may support a two-wire interface such an I2C, I3C, RFFE or SMBus interface at the Application Processor 602 and peripheral device 624, respectively and virtual GPIO and messages may be encapsulated into a packet transmitted over the communication link 622, which may be a multi-wire serial bus or multi-wire parallel bus for example.

VGI tunneling, as described herein, can be implemented using existing or available protocols configured for operating the communication link 622, and without the full complement of physical GPIO pins. VGI FSMs 610, 626 may handle GPIO signaling without intervention of a processor in the Application Processor 602 and/or in the peripheral device 624. The use of VGI can reduce pin count, power consumption, and latency associated with the communication link 622.

At the receiving device virtual GPIO signals are converted into physical GPIO signals. Certain characteristics of the physical GPIO pins may be configured using the virtual GPIO signals. For example, slew rate, polarity, drive strength, and other related parameters and attributes of the physical GPIO pins may be configured using the virtual GPIO signals. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface enables transmission of messages and virtual GPIO, whereby virtual GPIO, messages, or both can be sent in the serial data stream over a communication link 622. In one example, a serial data stream may be transmitted in packets and/or as a sequence of transactions over an I2C, I3C or RFFE bus. The presence of virtual GPIO data in I2C/I3C frame may be signaled using a special command code to identify the frame as a VGPIO frame. VGPIO frames may be transmitted as broadcast frames or addressed frames in accordance with an I2C or I3C protocol. In some implementations, a serial data stream may be transmitted in a form that resembles a universal asynchronous receiver/transmitter (UART) signaling protocol, in what may be referred to as VGI_UART mode of operation.

Figure 7:
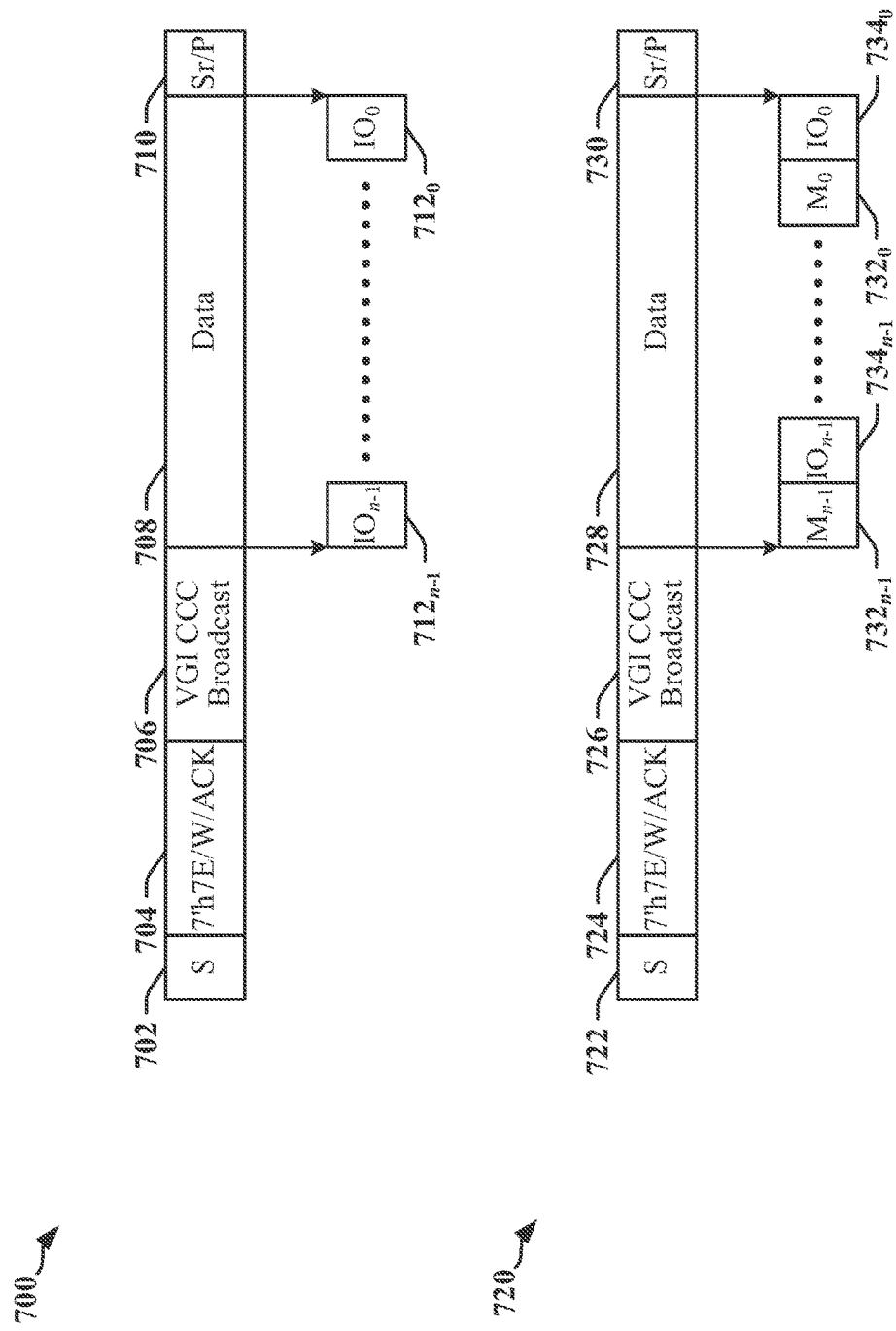
FIG. 7 illustrates examples of VGI broadcast frames according to certain aspects disclosed herein.

FIG. 7 illustrates examples of VGI broadcast frames 700, 720. In a first example, a broadcast frame 700 commences with a start bit 702 (S) followed by a header 704 in accordance with an I2C or I3C protocol. A VGI broadcast frame may be identified using a VGI broadcast common command code 706. A VGPIO data payload 708 includes a number (n) of virtual GPIO signals $712_0$-$712_{n-1}$, ranging from a first virtual GPIO signal $712_0$ to an nth virtual GPIO signal $712_{n-1}$. A VGI FSM may include a mapping table that maps bit positions of virtual GPIO signals in a VGPIO data payload 708 to conventional GPIO pins. The virtual nature of the signaling in the VGPIO data payload 708 can be transparent to processors in the transmitting and receiving devices.

In the second example, a masked VGI broadcast frame 720 may be transmitted by a host device to change the state of one or more GPIO pins without disturbing the state of other GPIO pins. In this example, the I/O signals for one or more devices are masked, while the I/O signals in a targeted device are unmasked. The masked VGI broadcast frame 720 commences with a start bit 722 followed by a header 724. A masked VGI broadcast frame 720 may be identified using a masked VGI broadcast common command code 726. The VGPIO data payload 728 may include I/O signal values $734_0$-$734_{n-1}$ and corresponding mask bits $732_0$-$732_{n-1}$, ranging from a first mask bit $M_0$ $732_0$ for the first I/O signal ($IO_0$) to an nth mask bit $M_{n-1}$ $732_{n-1}$ for the nth I/O signal $IO_{n-1}$.

A stop bit or synchronization bit (Sr/P 710, 730) terminates the broadcast frame 700, 720. A synchronization bit may be transmitted to indicate that an additional VGPIO payload is to be transmitted. In one example, the synchronization bit may be a repeated start bit in an I2C interface.

Figure 8:
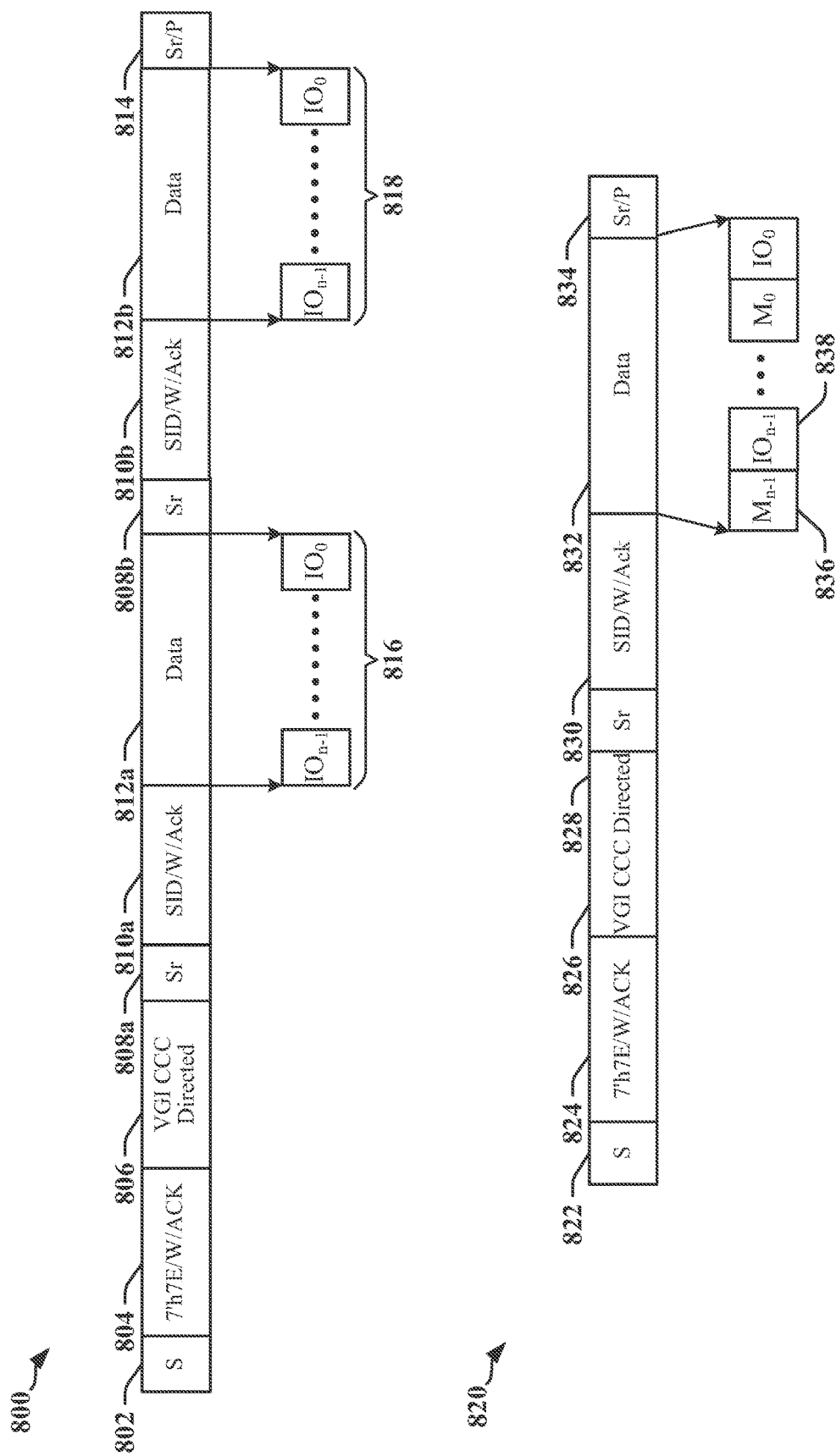
FIG. 8 illustrates examples of VGI directed frames according to certain aspects disclosed herein.

FIG. 8 illustrates examples of VGI directed frames 800, 820. In a first example, VGI directed frames 800 may be addressed to a single peripheral device or, in some instances, to a group of peripheral devices. The first of the VGI directed frames 800 commences with a start bit 802 (S) followed by a header 804 in accordance with an I2C or I3C protocol. A VGI directed frame 800 may be identified using a VGI directed common command code 806. The directed common command code 806 may be followed by a synchronization field 808*a* (Sr) and an address field 810*a* that includes a slave identifier to select the addressed device. The directed VGPIO data payload 812*a* that follows the address field 810*a* includes values 816 for a set of I/O signals that pertain to the addressed device. VGI directed frames 800 can include additional directed payloads 812*b* for additional devices. For example, the first directed VGPIO data payload 812*a* may be followed by a synchronization field 808*b* and a second address field 810*b*. In this example, the second directed VGPIO payload 812*b* includes values 818 for a set of I/O signals that pertain to a second addressed device. The use of VGI directed frames 800 may permit transmission of values for a subset or portion of the I/O signals carried in a broadcast VGPIO frame 700, 720.

In the second example, a masked VGI directed frame 820 may be transmitted by a host device to change the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked VGI directed frame 820 commences with a start bit 822 followed by a header 824. A masked VGI directed frame 820 may be identified using a masked VGI directed common command code 826. The masked VGI directed command code 826 may be followed by a synchronization field 828 (Sr) and an address field 830 that includes a slave identifier to select the addressed device. The directed payload 832 that follows includes VGPIO values for a set of I/O signals that pertain to the addressed device. For example, the VGPIO values in the directed data payload 832 may include I/O signal values 838 and corresponding mask bits 836.

A stop bit or synchronization bit (Sr/P 814, 834) terminates the VGI directed frames 800, 820. A synchronization bit may be transmitted to indicate that an additional VGPIO payload is to be transmitted. In one example, the synchronization bit may be a repeated start bit in an I2C interface.

Figure 9:
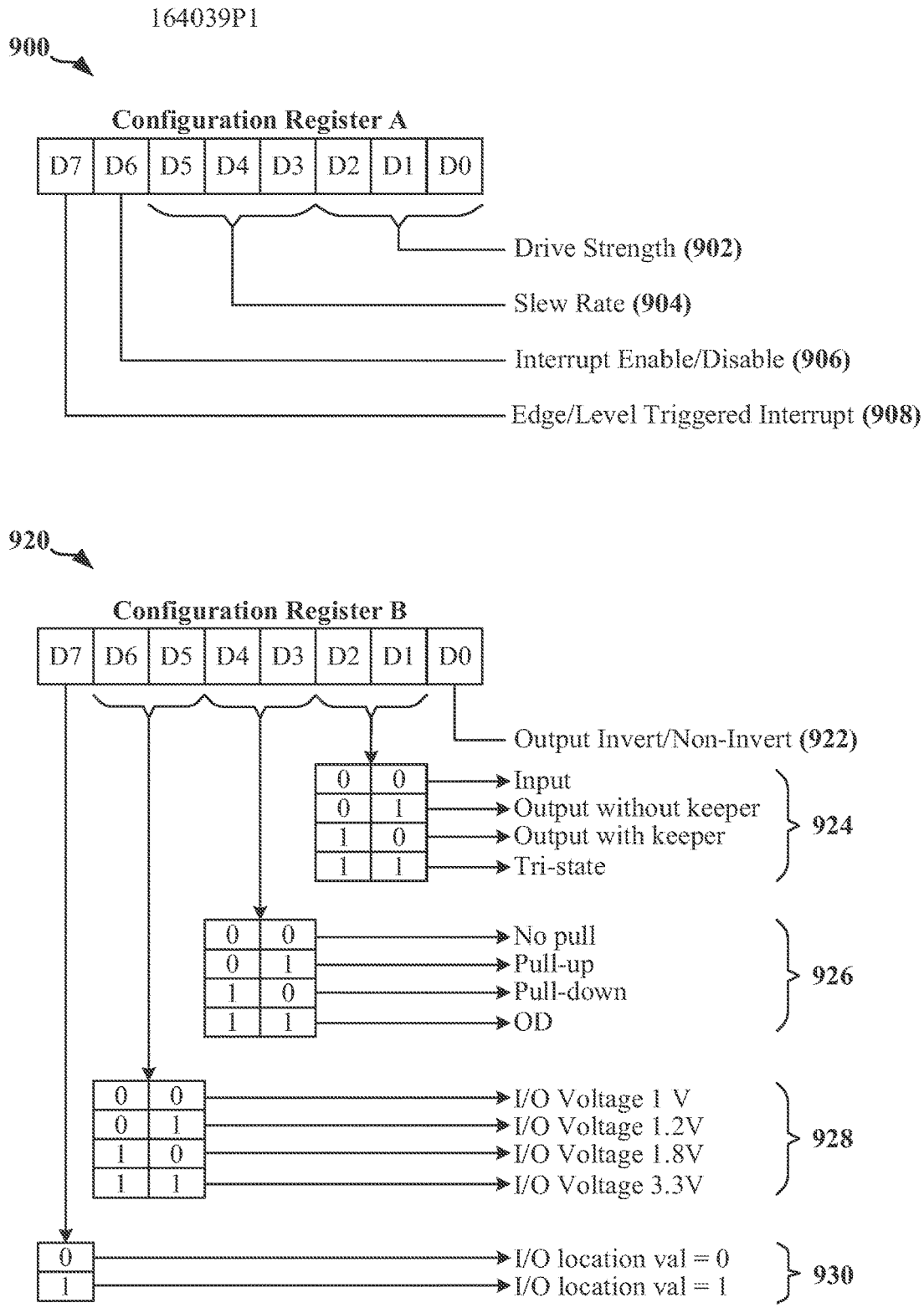
FIG. 9 illustrates configuration registers that may be associated with a physical pin according to certain aspects disclosed herein.

At the receiving device (e.g., the Application Processor 502 and/or peripheral device 504, 506, 508), received virtual GPIO signals are expanded into physical GPIO signal states presented on GPIO pins. The term "pin," as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 9 illustrates configuration registers 900 and 920 that may be associated with a physical pin. Each configuration register 900, 920 is implemented as a one-byte (8 bits) register, where different bits or groups of bits define a characteristic or other features that can be controlled through configuration. In a first example, bits D0-D2 902 control the drive strength for the GPIO pin, bits D3-D5 904 control the slew rate for GPIO pin, bit D6 906 enables interrupts, and bit D7 908 determines whether interrupts are edge-triggered or triggered by voltage-level. In a second example, bit D0 922 selects whether the GPIO pin receives an inverted or non-inverted signal, bits D1-D2 924 define a type of input or output pin, bits D3-D4 926 defines certain characteristics of an undriven pin, bits D5-D6 928 define voltage levels for signaling states, and bit D7 930 controls the binary value for the GPIO pin (i.e., whether GPIO pin carries carry a binary one or zero).

Consolidating GPIO For Multiple Devices Or Communication Links

Figure 10:
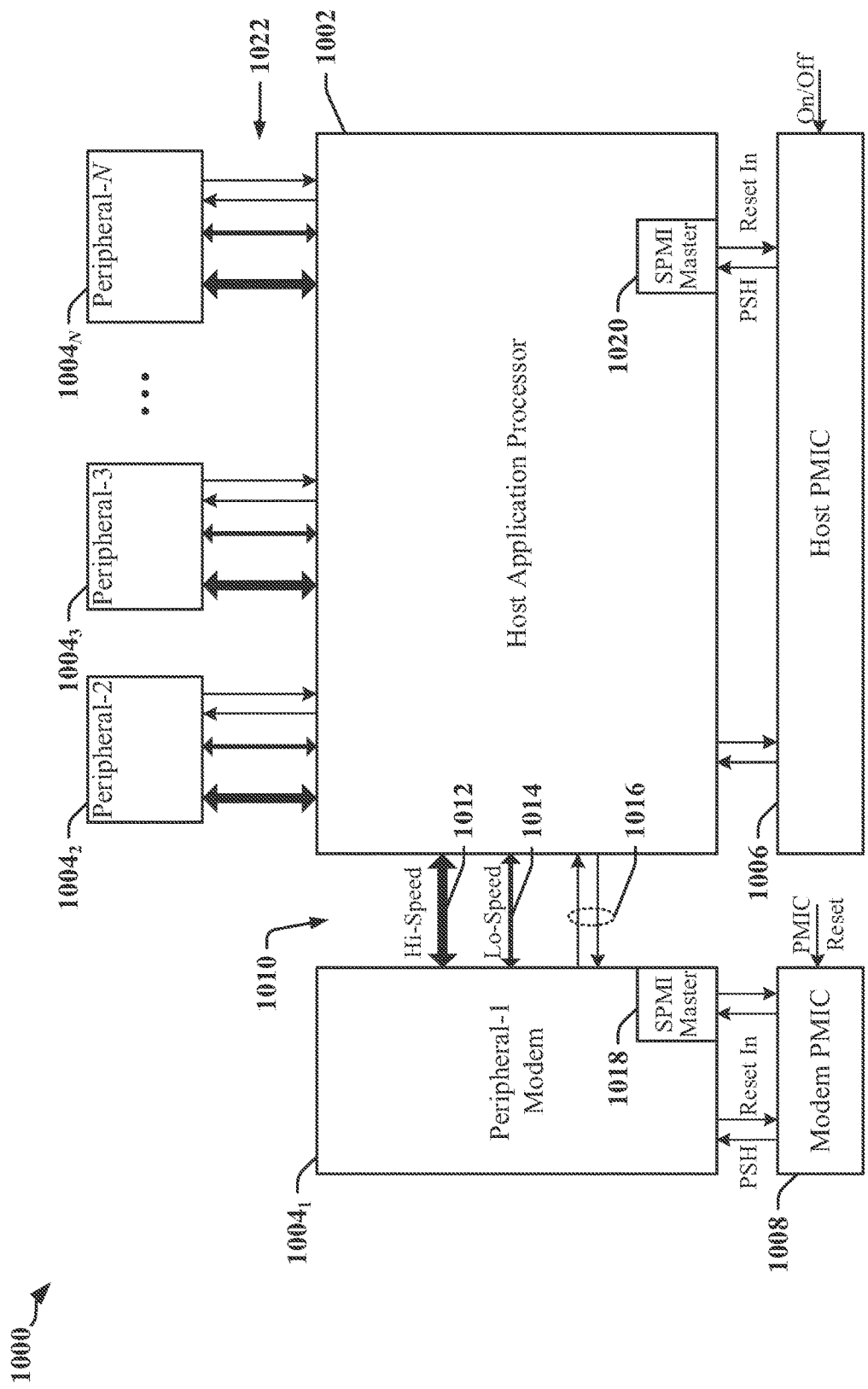
FIG. 10 illustrates an example of a system which includes one or more communication links that employ sideband GPIO.

FIG. 10 illustrates an example of a system 1000 which includes one or more communication links that employ sideband GPIO and that may not easily be serialized and transmitted in a single serial link In some examples, there may be an impediment to transmitting sideband GPIO over a single parallel data communication link. To facilitate description, the example of a serial data link may be employed, although the concepts described herein may be applied to parallel data communication links. The system 1000 may include an application processor 1002 that may serve as a host device on various communication links, multiple peripherals 1004$_1$-1004$_N$, and one or more power management integrated circuits (PMICs 1006, 1008). In the illustrated system 1000, at least a first peripheral 1004$_1$ may include a modem. The application processor 1002 and the first peripheral 1004$_1$ may be coupled to respective PMICs 1006, 1008 using GPIO that provides a combination of reset and other signals, and a system power management interface (SPMI 1018, 1020). The SPMI 1018, 1020 operates as a serial interface defined by the MIPI Alliance that is optimized for the real-time control of devices including PMICs 1006, 1008. The SPMI 1018, 1020 may be configured as a shared bus that provides high-speed, low-latency connection for devices, where data transmissions may be managed, according to priorities assigned to different traffic classes.

The application processor 1002 may be coupled to each of the peripherals 1004$_1$-1004$_N$ using multiple communication links 1012, 1014 and GPIO 1016. For example, the application processor 1002 may be coupled to the first peripheral 1004$_1$ using a high-speed bus 1012, a low-speed bus 1014 and input and/or output GPIO 1016. As disclosed herein, GPIO signals may be virtualized and transferred over certain serial interfaces, such as the I3C interface. The transfer of the GPIO signals is facilitated using common command code protocols available in I3C interfaces that may not be available in other types of interface. Accordingly, the virtualization of GPIO may be rendered difficult or impractical when certain high speed communication links are used to couple the application processor 1002 and the peripherals 1004$_1$-1004$_N$.

Figure 11:
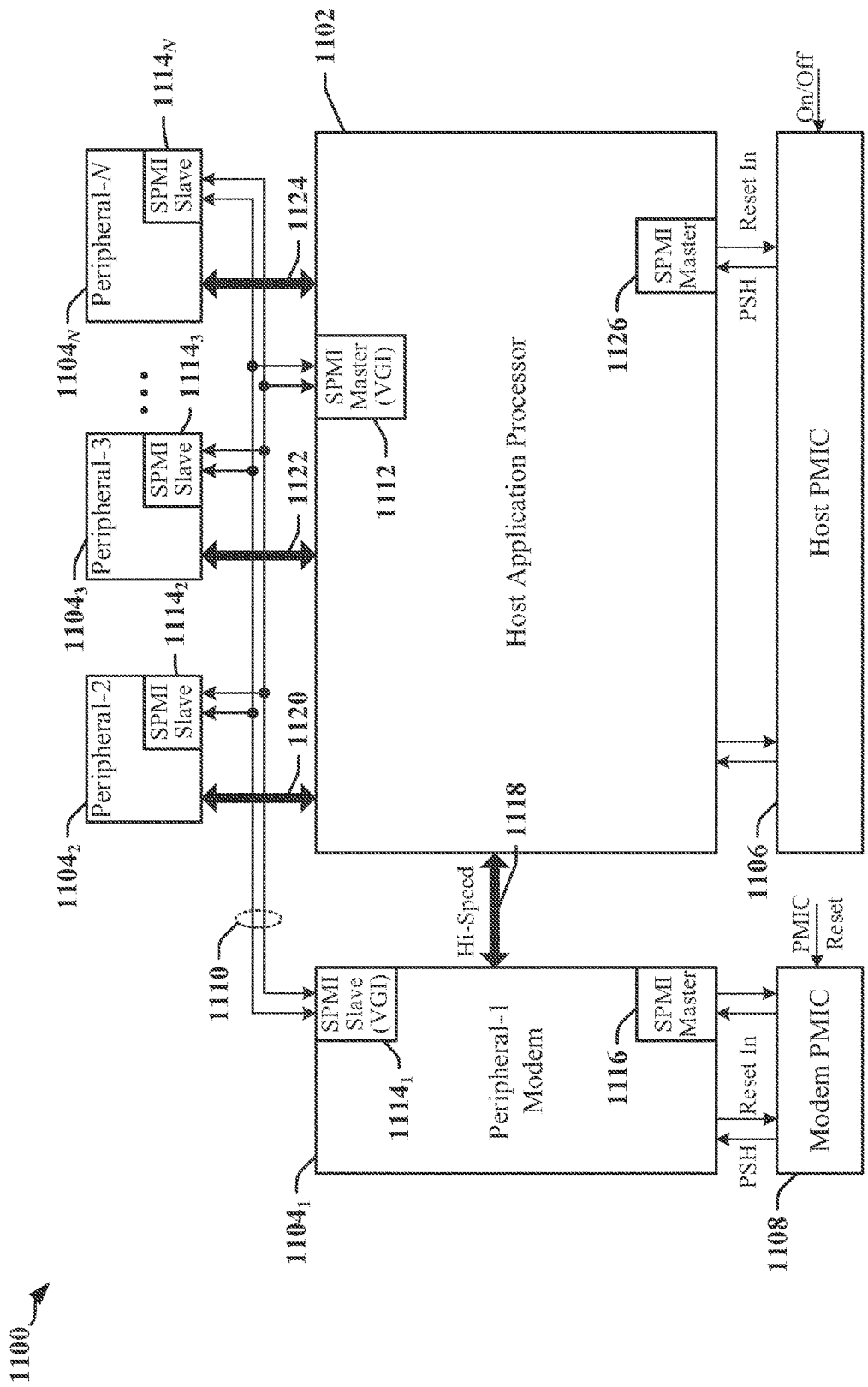
FIG. 11 illustrates an example of a system which virtualizes and consolidates communication of GPIO state associated with multiple devices and/or communication links using a single serial communication link in accordance with certain aspects disclosed herein.

According to certain aspects disclosed herein, GPIO may be consolidated for multiple communication links and devices. FIG. 11 illustrates an example of a system 1100 which virtualizes and consolidates communication of GPIO state associated with multiple devices and/or communication links using a single serial communication link. In the illustrated example, a multi-drop serial bus 1110 operated in accordance with SPMI protocols may be used to carry GPIO state information for multiple devices, including for example an application processor 1102 and multiple peripherals 1104$_1$-1104$_N$. State information for sideband GPIO associated with each high-speed serial link 1118, 1120, 1122, 1124 and other GPIO coupling the application processor 1102 to one or more of the peripherals 1104$_1$-1104$_N$ may be transmitted as VGI over the serial bus 1110. In one example, the application processor 1102 may include an SPMI master 1112 and each of the peripherals 1104$_1$-1104$_N$ may include SPMI slaves 1104$_1$-1104$_N$ that may be used exclusively for exchange of VGI. In another example, the serial bus 1110 may be used for transferring data and commands unrelated to VGI, in addition to VGI.

The system 1100 may include an application processor 1102 that may serve as a host device on various communication links, including the serial bus 1110. One or more power management integrated circuits (PMICs 1106, 1108) may be included in the system 1100. In the illustrated system 1100, at least a first peripheral 1104₁ may include a modem.

Virtualizing GPIO can result in a reduced number of input/output pins, reduce IC package size, and reduces printed circuit board routing complexity. The serial bus 1110 may be operated in accordance with SPMI protocols. In some examples, other protocols may be used for transferring VGI at high speed, and with low latency. In one example the RFFE bus may be employed for communicating VGI. As disclosed herein, GPIO signals may be virtualized and transferred over the serial bus 1110. The transfer of the GPIO signals may be accomplished without modifying the protocols used on the serial bus 1110. In some examples, GPIO consolidation may be implemented using a state machine to control virtualization of GPIO. In many examples, no modification of communication protocol is required. For example, additions, modifications and/or deletions of protocol-defined command and/or common command codes are not required to control GPIO state transmission.

According to certain aspects, multiple GPIO ports can be virtualized such that the GPIO state information transmitted over the serial bus 1110 may relate to consolidated state for multiple GPIO ports. In one example, multiple GPIOs may be supported for each port. The state machine may be configured to automatically identify when GPIO state information should be transmitted, and to which devices 1102, 1104₁-1104ₙ the GPIO state information should be addressed. In some examples, state information related to one output GPIO may be transmitted and/or routed by the application processor 1102 (for example) to modify input GPIO of two or more of the peripherals 1104₁-1104ₙ.

In some instances, the state machine may be adapted to implement automatic bit-level masking to minimize software complexity and overhead and transmission latency. In some examples, a second level GPIO cross-bar multiplexer/demultiplexer scheme may be employed to enable routing to all possible routing destinations and combinations of routing destinations. GPIO state information may be transmitted to a targeted peripheral 1104₁-1104ₙ or to a group of peripherals 1104₁-1104ₙ. A configurable priority scheme may be implemented to select between GPIO state transmissions and messaging transmissions.

Examples of GPIO State Consolidation

Figure 12:
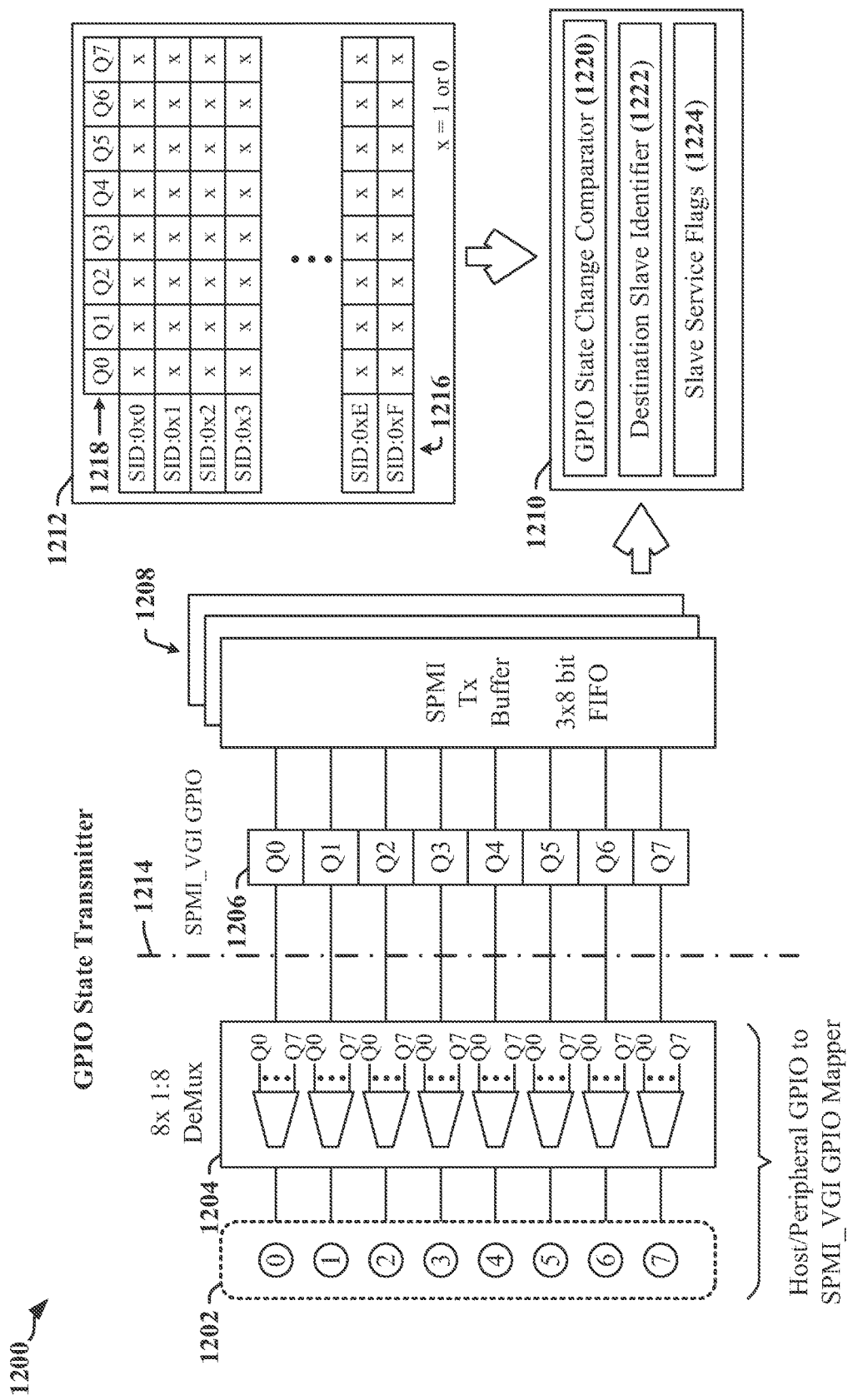
FIG. 12 is a flow diagram that illustrates operation of a GPIO state transmitter adapted in accordance with certain aspects disclosed herein.

FIG. 12 is a flow diagram 1200 that illustrates operation of a GPIO state transmitter. The flow diagram 1200 relates to an example of a host device that consolidates and transmits GPIO state information corresponding to a set of GPIOs. The set of GPIOs may include host or peripheral GPIOs 1202 which can be consolidated in SPMI_VGI GPIOs 1206. In some examples, these GPIOs 1202 are included in a unified GPIO map maintained by the host or peripheral device. Use of GPIOs 1202 derived from the unified GPIO map permits software transparency. In other words, the underlying software using these GPIOs 1202 does not require any change based on the usage of these GPIOs 1202 for generating SPMI_VGI GPIOs 1206.

Groups of 8 GPIOs 1202 may be consolidated for producing SPMI_VGI GPIOs 1206. Each group of 8 GPIOs 1202 to be consolidated over SPMI_VGI GPIOs 1206 may configured using a 1-to-8 de-multiplexer 1204. The de-multiplexer 1204 enables mapping of the system or peripheral GPIOs to SPMI_VGI GPIOs 1206. All possible mappings of GPIOs to SPMI_VGI GPIOs 1206 are enabled by the de-multiplexer 1204. In one example, a 1:1 mapping may be used for host/peripheral GPIO to SPMI GPIO mapping. Each de-multiplexer 1204 may be controlled using 4 control bits, where 3 bits (e.g., bits [D2:D0]) configure the de-multiplexer 1204 and the fourth bit (e.g., bit D4) may be used to enable or disable the de-multiplexer 1204. SPMI_VGI GPIOs 1206 produced by the de-multiplexer 1204 represent the GPIO states that are transmitted in SPMI_VGI.

In some examples, soft GPIOs may be employed, where the configuration (Q0 to Q7) of SPMI_VGI GPIOs 1206 may be set programmatically. In this type implementation, host/peripheral GPIO 1202 and de-multiplexer 1204 blocks are not required. The dashed 1214 line illustrates a possible partitioning when the configuration of the SPMI_VGI GPIOs 1206 is set programmatically.

A transmit buffer 1208 may be used to store GPIO state changes while a previous state change is communicated. The transmit buffer 1208 may be implemented or configured to operate as a FIFO. In the illustrated example, the FIFO has a depth of at least three storage locations. The transmit buffer 1208 may be configured to accommodate any GPIO state changes that may occur happen previous state change information is in the transmit phase.

A slave association map 1212 may be provided. The slave association map 1212 may be indexed or ordered by slave identifier (SIDs 1216). The slave association map 1212 establishes the association of each available or possible slave with the output GPIO bits 1218. In one example, the slaves may include 16 slave devices having identifiers in the range SID=0x0 to SID=0xF. More than one slave may be associated with a given GPIO bit 1218, such that configurational equivalence of a single output GPIO bit 1218 connected to multiple peripherals may be provided as needed by a system design. In the example, each bit location can have the value '1' or '0' where '1' indicates an association between a SID 1216 and an output GPIO bit 1218, while a '0' indicates no association between a SID 1216 and an output GPIO bit 1218. In one example, a maximum of 16 slaves may be supported on the bus, and the slave association map 1212 requires 16-bytes of register space for each group of 8 output GPIO bits 1218. In other examples, the bus may support more than 16 slave devices, and the slave association map 1212 may be provisioned with register space sufficient to map the number of expected or possible slave devices.

In an example where the host is configured to support 16 slave devices and provide up to 16 bytes for configuring output GPIO bits 1218, the slave association map 1212 on the host side requires 16*16=256 bytes. Each slave, however, need support only 8 output GPIO bits and hence the slave association map on the slave side use only 16 bytes.

A transmit logic unit 1210 may be provided to send GPIO state information in accordance with standard SPMI protocols. The transmit logic unit 1210 may include certain modules and/or circuits including a GPIO state change comparator 1220, a destination slave identifier module 1222, and a slave service flags module 1224.

The GPIO state change comparator 1220 performs a bit level comparison between the last transmitted GPIO state and the GPIO state that is currently ready in the transmit buffer for transmission. A change at one or more bit location acts as trigger for GPIO state transmission.

The destination slave identifier module 1222 accesses the slave association map 1212 to determine which GPIO bits have changed, and to identify which GPIO or slaves are the destination for transmission of the GPIO state.

The slave service flags module 1224 may operate as a slave service tracker. When slaves have been identified by the destination slave identifier module 1222, corresponding flags are marked as active. The flags are cleared when all the slaves have been served.

Figure 13:
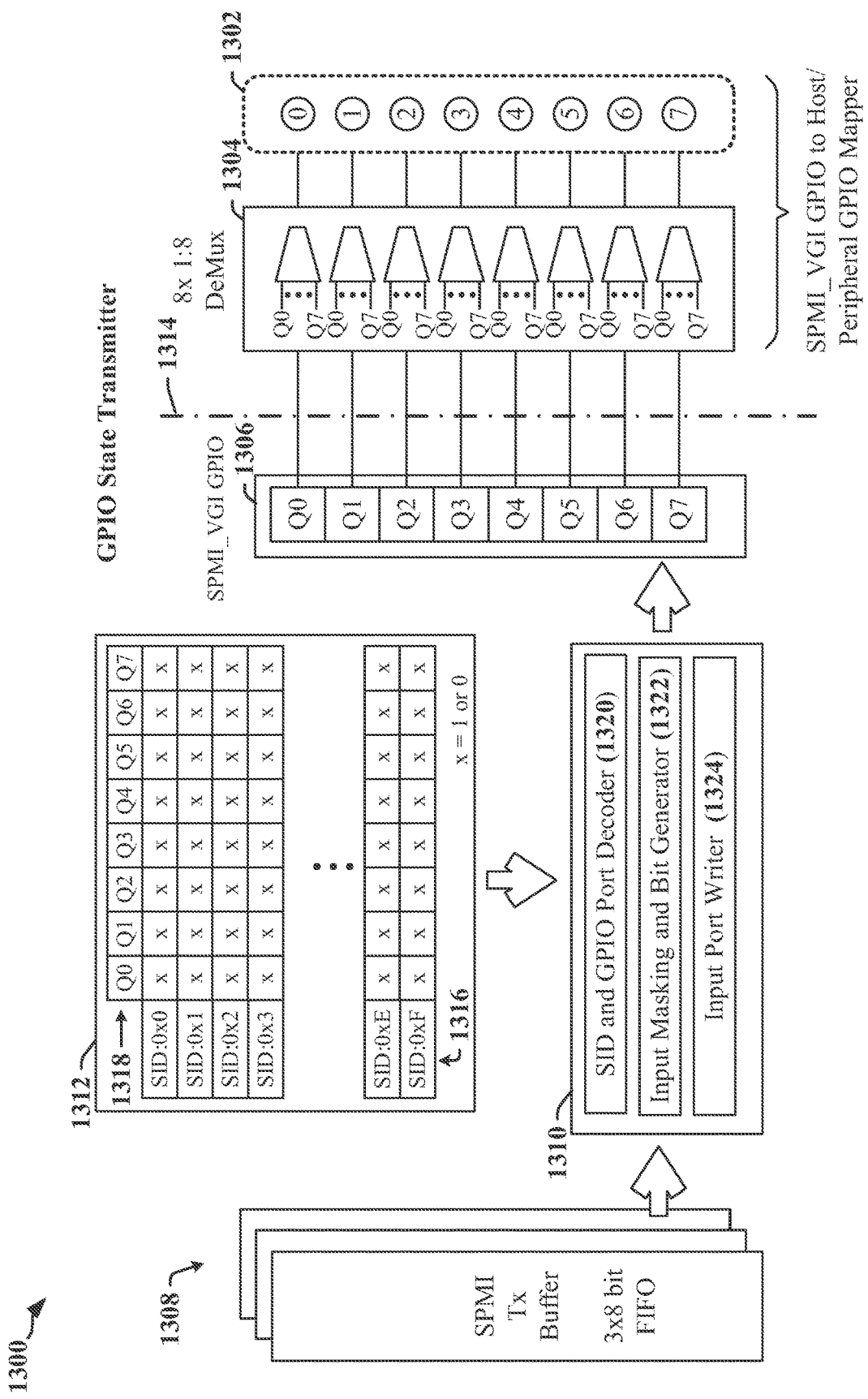
FIG. 13 is a flow diagram that illustrates operation of a GPIO state receiver adapted in accordance with certain aspects disclosed herein.

FIG. 13 is a flow diagram 1300 that illustrates operation of a GPIO state receiver. The flow diagram 1300 relates to an example of a slave device that receives GPIO state information corresponding to a set of GPIOs. The set of GPIOs may include host or peripheral GPIOs 1302. A receive buffer 1308 may be provided to receive data payloads received from the SPMI bus. The receive buffer 1308 may be organized as a FIFO that can handle a 16-byte space to accommodate the maximum data payload received from the SPMI bus. The depth of receive buffer 1308 may be three locations, although the depth may be selected according to implementation requirements and choices.

A slave association map 1312 may be maintained at the slave to process input GPIOs. The slave association map 1312 may define an input GPIO mask to be applied to the incoming GPIOs for a particular slave and particular port of the slave. For example, a transmitting device may be configured to support a maximum number of 16 output GPIO ports, and a slave may be required to have a corresponding number (16) of association maps. Each association map relates to one of the ports, which may be in the enumerated port: #0 through port: #F. In order to accommodate all ports in this example, while maintaining association with all possible devices on the SPMI bus, each device requires 16*16=256 1-byte locations to store the I/P masks.

A receive logic unit 1310 may be provided to receive GPIO state information in accordance with standard SPMI protocols. The receive logic unit 1310 may include certain modules and/or circuits including an SID and GPIO Port Decoder 1320, an input masking and bit generator 1322, and an input port writer 1324.

The SID and GPIO Port Decoder 1320 may decode the SID and GPIO port number of the transmitting device, which is contained in the first byte of the payload. The SID may be mapped to four bits (e.g., [D7:D4]) and the GPIO port-number may be mapped to another four bits (e.g., [D3:D0]). The next byte of the payload includes the GPIO states. Based on the SID and GPIO port number, the receiving device may select an associated input mask to be applied to the received GPIO state byte.

The input masking and bit generator 1322 may be used to apply the mask to the payload. In one example, an input mask bit set to '1' implies that the corresponding GPIO bit is to be used, an input mask bit set to '0' implies that the corresponding GPIO bit is to be ignored.

The input port writer 1324 writes GPIO states to the SPMI_VGI GPIO port 1306. The SPMI_VGI GPIO port 1306 maintains the received GPIOs. A de-multiplexer 1304 is provided to enable routing flexibility for the received GPIOs.

At system start-up, the slave association maps 1212, 1312 and masking tables may be configured by the host processor. In some instances, the priority schemes may be dynamically configurable. Upon occurrence of a GPIO state change, a transmission may be initiated. Receiving peripherals respond to GPIOs as enabled in the previously set mask. In some implementations, the slave association maps 1212, 1312 and mask tables may be dynamically reconfigured.

Minimum Latency Bridging

Referring again to FIG. 11, certain systems may include devices 1102, 1104$_1$ that include multiple data communication interfaces. In the illustrated example, the data communication interfaces may include serial interfaces 1114$_1$/1116, 1112/1126 that are coupled to different serial links. The concepts disclosed herein may be applied to examples in which the data communication interfaces may include data communication interfaces that are coupled to different parallel data links Many multi-drop serial bus architectures permit connection of multiple peripherals to a single bus, although in certain applications such connection is not permitted and/or is not feasible. For example, the use of a single bus may be precluded by the expectation of unpredictable latency, even when the probability of latency issues may be very low. In some implementations, multiple instances of serial modules, blocks or circuits on a given device may result, and may introduce communication discontinuity. A primary need exists to have communication from the host to all other devices, including in the realm of communication discontinuity. Traditional methods for bridging gaps and discontinuities can result in impermissible latency.

In the example illustrated in FIG. 11, the modem 1104$_1$ has two SPMI blocks 1114$_1$, 1116. The two SPMI blocks 1114$_1$, 1116 may be implemented when the SPMI block 1116 coupling the modem 1104$_1$ to the PMIC 1108 is not permitted to be shared between other peripherals to ensure minimum latency communication between the modem 1104$_1$ and the modem PMIC 1108. The application processor 1102 may need to control the modem PMIC 1108, or may need to receive information of interest from the modem PMIC 1108. Having no direct connection, a bridging link may be established with the involvement of a processor on the modem 1104$_1$ which can introduce undesired latency.

Figure 14:
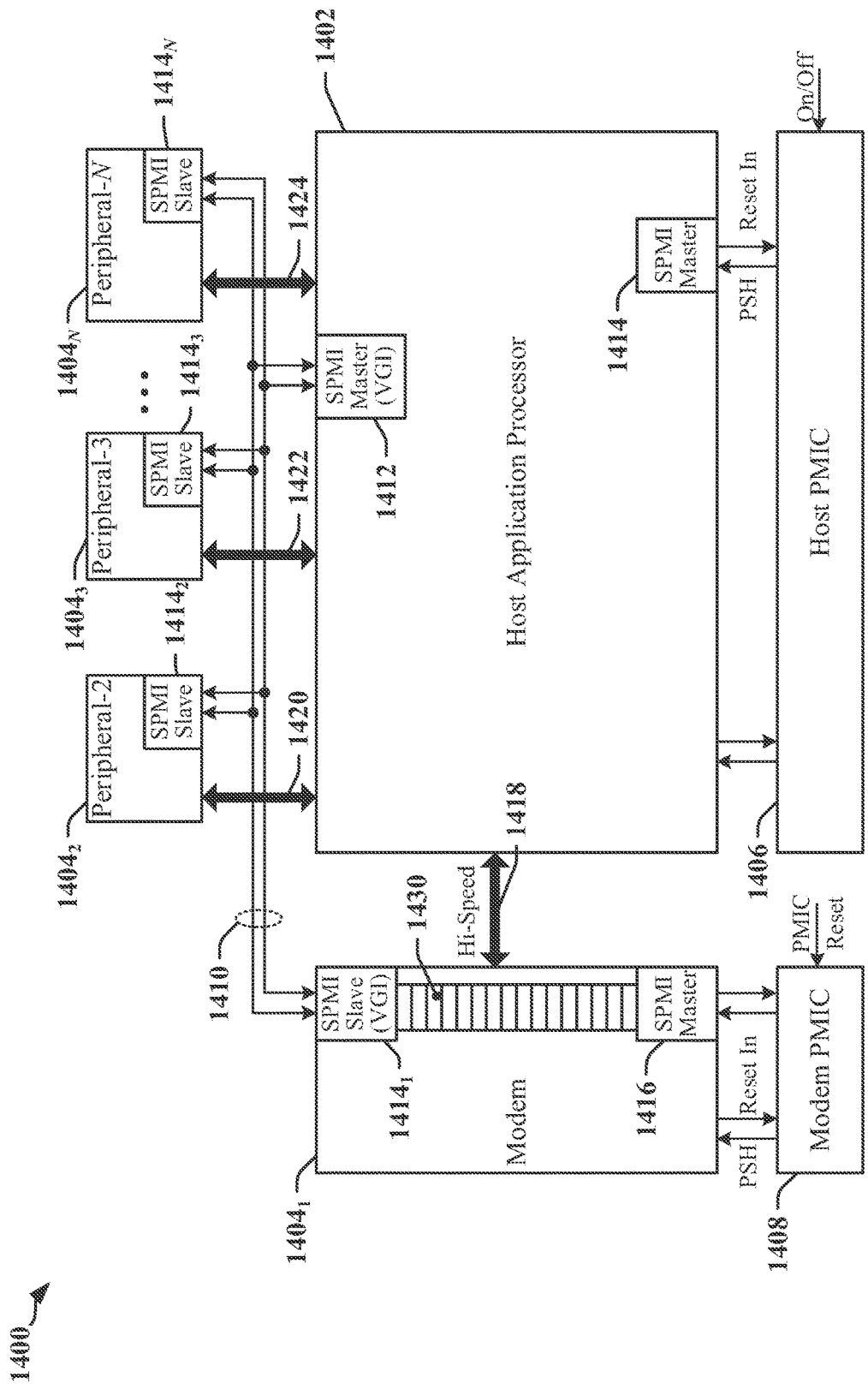
FIG. 14 illustrates a first example of a minimum latency serial bus bridging in accordance with certain aspects disclosed herein.

Certain aspects disclosed herein relate to the provision of minimum latency bridging that meets time constraints that may exist for a desired system operation. FIG. 14 illustrates a first example 1400 of a minimum latency serial bus bridging in accordance with certain aspects disclosed herein. In this example 1400, a shared register space 1430 is provided whereby a register marked as output for a first SPMI block 1414$_1$ is treated as input by the second SPMI block 1416, and a register marked as output for the second SPMI block 1416 is treated as input by the first SPMI block 1414$_1$. In this example, the first SPMI block 1414$_1$ and the second SPMI block 1416 are typically collocated within the IC that includes the modem 1404$_1$.

Application processor 1402 writes to the modem PMIC 1408 are facilitated by the shared register space 1430, which acts as the bridge between the two instances of the SPMI blocks 1414$_1$, 1416 within the modem 1404$_1$. When the application processor 1402 writes to an output location of the first SPMI block 1414$_1$, the content is immediately reflected to a read register of the second SPMI block 1416. Shared register logic triggers transmit logic of the second SPMI block 1416 to send a message to the modem PMIC 1408 targeting a pre-configured register location.

The application processor 1402 may send a read request to the first SPMI block 1414$_1$, targeting a register of interest in the modem PMIC 1408. The read request is sensed by bridging logic and converted to a secondary read request from the second SPMI block 1416 to the modem PMIC 1408. The content received from the modem PMIC 1408 is read and loaded into the assigned shared register space 1430.

The first SPMI block 1414₁ may then transmit the appropriate content of the shared register space 1430 to the application processor 1402.

The application processor 1402 may respond to an interrupt based write by the modem PMIC 1408. The modem PMIC 1408 uses SPMI interrupt mechanism to write to the shared register space 1430. A write to the shared register space 1430 triggers an interrupt from the first SPMI block 1414₁ to the SPMI block 1412 of the application processor 1402. Subsequently, the SPMI block 1412 of the application processor 1402 fetches the content from the shared register space 1430 as part of the interrupt service routine.

Figure 15:
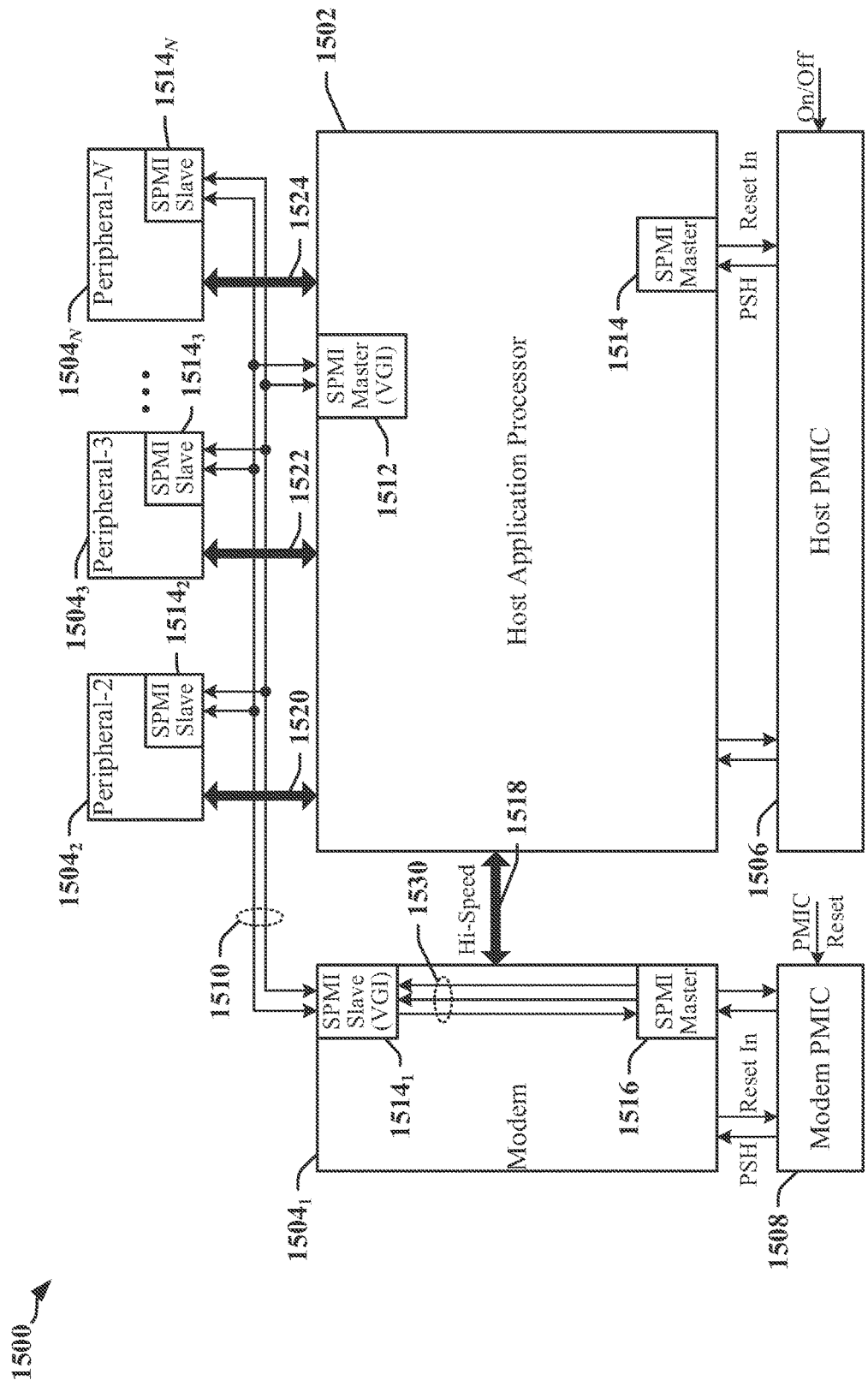
FIG. 15 illustrates a second example of a minimum latency serial bus bridging in accordance with certain aspects disclosed herein.

FIG. 15 illustrates a second example of a minimum latency serial bus bridging in accordance with certain aspects disclosed herein. In this example, a full-duplex, high-speed serial link 1530 is deployed between a first SPMI block 1514₁ and a second SPMI block 1516. Each SPMI block 1514₁,1516 has parallel-to-serial and serial-to-parallel shift registers to facilitate the communication over the high-speed serial link 1530 without processor intervention. In this example, the first SPMI block 1514₁ and the second SPMI block 1516 are typically not co-located. Use of the shift-register architecture while using a full duplex serial link—on the die, for example—demands a minimum number of signal traces and addresses the issue of routing multiple lines on the die.

Application processor 1502 writes to the modem PMIC 1508 are facilitated by the high-speed serial link 1530, which acts as the bridge between the two instances of the SPMI blocks 1514₁, 1516 within the modem 1504₁. When the application processor 1502 writes to an output location of the first SPMI block 1514₁, the content is automatically transmitted to the second SPMI block 1516 over the high-speed serial link 1530. Serial shift register logic triggers transmit logic of the second SPMI block 1516 to send a message to the modem PMIC 1508 targeting a pre-configured register location.

The application processor 1502 may send a read request to the first SPMI block 1514₁, targeting a register of interest in the modem PMIC 1508. The read request is sensed by bridging logic and converted to a secondary read request from the second SPMI block 1516 to the modem PMIC 1508. The content received from the modem PMIC 1508 is read and automatically transmitted over the high-speed serial link 1530 to the first SPMI block 1514₁. The first SPMI block 1514₁ may then transmit the appropriate content of the high-speed serial link 1530 to the application processor 1502.

The application processor 1502 may respond to an interrupt-based write by the modem PMIC 1508. The modem PMIC 1508 uses SPMI interrupt mechanism to cause an interrupt request to be transmitted over the high-speed serial link 1530 to the first SPMI block 1514₁. The arrival of the interrupt request at the first SPMI block 1514₁ triggers an interrupt from the first SPMI block 1514₁ to the SPMI block 1512 of the application processor 1502. Subsequently, the SPMI block 1512 of the application processor 1502 receives data through the high-speed serial link 1530 as part of the interrupt service routine.

Examples of Processing Circuits and Methods

Figure 16:
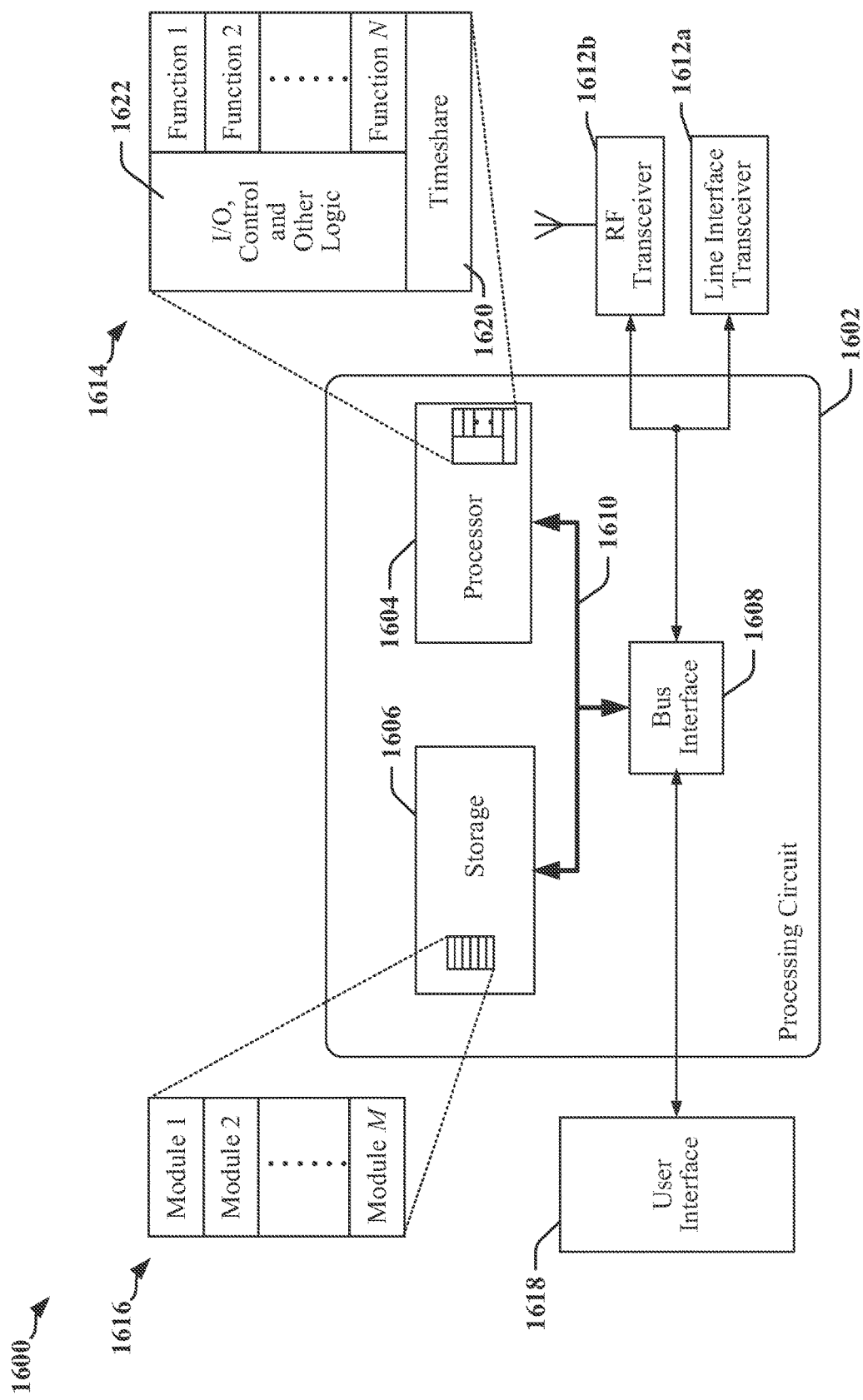
FIG. 16 illustrates one example of an apparatus employing a processing circuit that may be adapted according to certain aspects disclosed herein.

FIG. 16 is a diagram illustrating an example of a hardware implementation for an apparatus 1600 employing a finite state machine 610 to optimize virtual GPIO latency. In some examples, the apparatus 1600 may configure the operation of the finite state machine 610. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The bus 1610 may also link various other circuits such as timing sources, timers, peripherals, voltage regulators, and power management circuits. A bus interface 1608 may provide an interface between the bus 1610 and one or more transceivers 1612a, 1612b. A transceiver 1612a, 1612b may be provided for each networking technology supported by the processing circuit. In some instances, multiple networking technologies may share some or all of the circuitry or processing modules found in a transceiver 1612a, 1612b. Each transceiver 1612a, 1612b provides a means for communicating with various other apparatus over a transmission medium. In one example, a transceiver 1612a may be used to couple the apparatus 1600 to a multi-wire bus. In another example, a transceiver 1612b may be used to connect the apparatus 1600 to an RF network. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612a, 1612b, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612a, 1612b, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, a transceiver 1612a, 1612b, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 17:
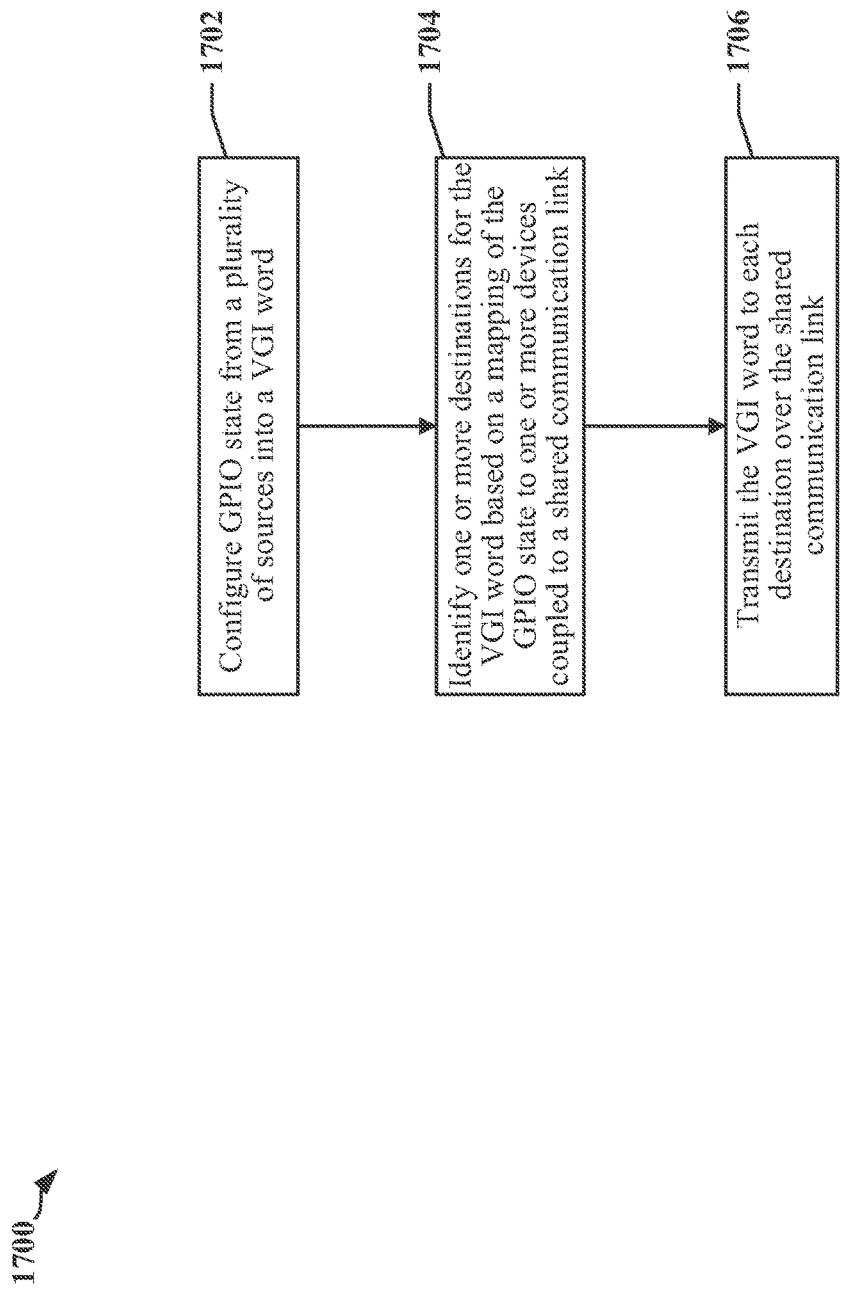
FIG. 17 is a first flowchart illustrating certain operations of an application processor adapted in accordance with certain aspects disclosed herein.

FIG. 17 is a flowchart 1700 of a method that may be performed at a transmitting device. Portions of the method may be performed by a finite state machine in the transmitting device.

At block 1702, the finite state machine may configure GPIO state from a plurality of sources into a VGI word. The plurality of sources may include GPIO associated with two or more communication links. The plurality of sources may include GPIO associated with two or more devices.

At block 1704, the finite state machine may identify one or more destinations for the VGI word based on a mapping of the GPIO state to one or more devices coupled to a shared communication link. The mapping may associate each bit of the VGI word with one or more devices that includes a GPIO pin corresponding to a GPIO in a source of the each bit.

At block 1706, the finite state machine may transmit the VGI word to each destination over the shared communication link.

In one example, each receiving device of the VGI word masks the of the VGI word in accordance with a masking table that identifies GPIO state information in the VGI word affecting a GPIO pin in the each receiving device.

In some examples, the VGI word may be transmitted in a data packet in accordance with an SPMI protocol. The VGI word may be transmitted in the data packet to a first destination through a first SPMI interface of an intermediate device. The intermediate device may relay the data packet to the first destination through a second SPMI interface of the intermediate device.

In one example, the VGI word is transmitted in a data packet in accordance with an RFFE protocol or other standards-defined protocol.

In one example, each bit of a plurality of bits received from the plurality of sources represents GPIO state of one pin in a device, and the plurality of bits may be configured using a multiplexer to form the VGI word.

One or more additional VGI words may be buffered while transmitting the VGI word.

Figure 18:
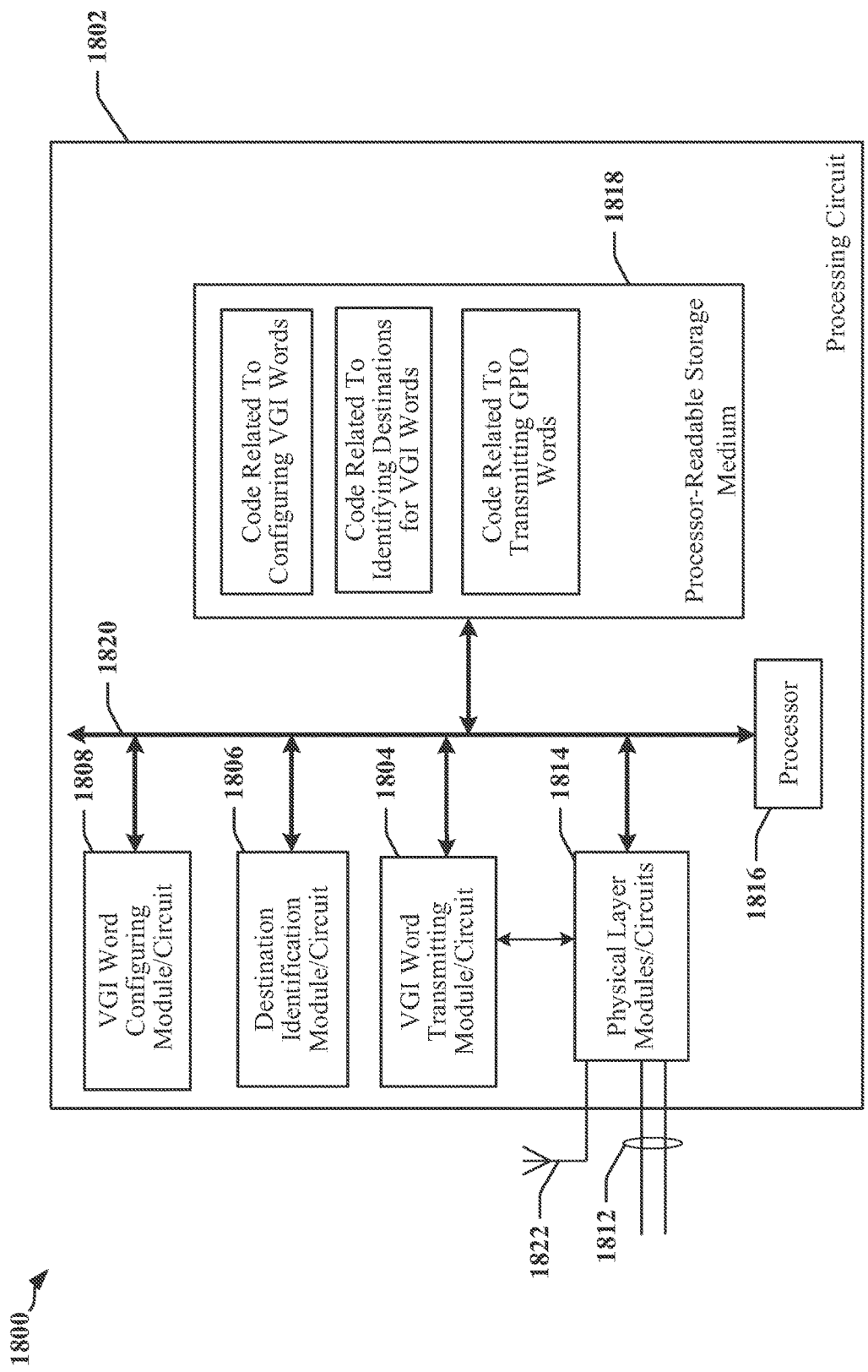
FIG. 18 illustrates a first example of a hardware implementation for an apparatus adapted in accordance with certain aspects disclosed herein.

FIG. 18 is a diagram illustrating a simplified example of a hardware implementation for an apparatus 1800 employing a processing circuit 1802. The apparatus may implement a bridging circuit in accordance with certain aspects disclosed herein. The processing circuit typically has a controller or processor 1816 that may include one or more microprocessors, microcontrollers, digital signal processors, sequencers and/or state machines. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the controller or processor 1816, the modules or circuits 1804, 1806 and 1808, and the processor-readable storage medium 1818. One or more physical layer circuits and/or modules 1814 may be provided to support communications over a communication link implemented using a multi-wire bus 1812, through an antenna 1822 (to an RF network for example), and so on. The bus 1820 may also link various other circuits such as timing sources, peripherals, voltage regulators, and power management circuits, which are well known in the art, and therefore, will not be described any further.

The processor 1816 is responsible for general processing, including the execution of software, code and/or instructions stored on the processor-readable storage medium 1818. The processor-readable storage medium may include a non-transitory storage medium. The software, when executed by the processor 1816, causes the processing circuit 1802 to perform the various functions described supra for any particular apparatus. The processor-readable storage medium may be used for storing data that is manipulated by the processor 1816 when executing software. The processing circuit 1802 further includes at least one of the modules 1804, 1806 and 1808. The modules 1804, 1806 and 1808 may be software modules running in the processor 1816, resident/stored in the processor-readable storage medium 1818, one or more hardware modules coupled to the processor 1816, or some combination thereof. The modules 1804, 1806 and 1808 may include microcontroller instructions, state machine configuration parameters, or some combination thereof.

In one configuration, the apparatus 1800 includes modules and/or circuits 1808 adapted to configure VGI words containing GPIO-state information, modules and/or circuits 1806 configured to determine one or more destinations for the VGI word, and modules and/or circuits 1804 configured to transmit a packet comprising the VGI word.

In one example, the apparatus 1800 has a bus interface configured to couple the apparatus to a serial bus, and a VGI-FSM. The VGI-FSM may be configured to map GPIO state from a plurality of sources into a VGI word, identify one or more destinations for VGI word based on a mapping of the GPIO state to one or more devices coupled to a shared communication link, and transmit the VGI word through the bus interface to at least one destination. The plurality of sources includes GPIO associated with two or more communication links. The plurality of sources may include GPIO associated with two or more devices. The bus interface may be configured to transmit the VGI word in a data packet over the serial bus in accordance with an SPMI protocol. The bus interface may be configured to transmit the VGI word in a data packet over the serial bus in accordance with an RFFE protocol.

The apparatus may have a mapper configured to associate each bit of the VGI word with one or more devices that includes a GPIO pin corresponding to a GPIO in a source of the each bit. The mapper may include a multiplexer configured to form the VGI word by configuring a plurality of bits representing GPIO state of physical pins in a device.

Figure 19:
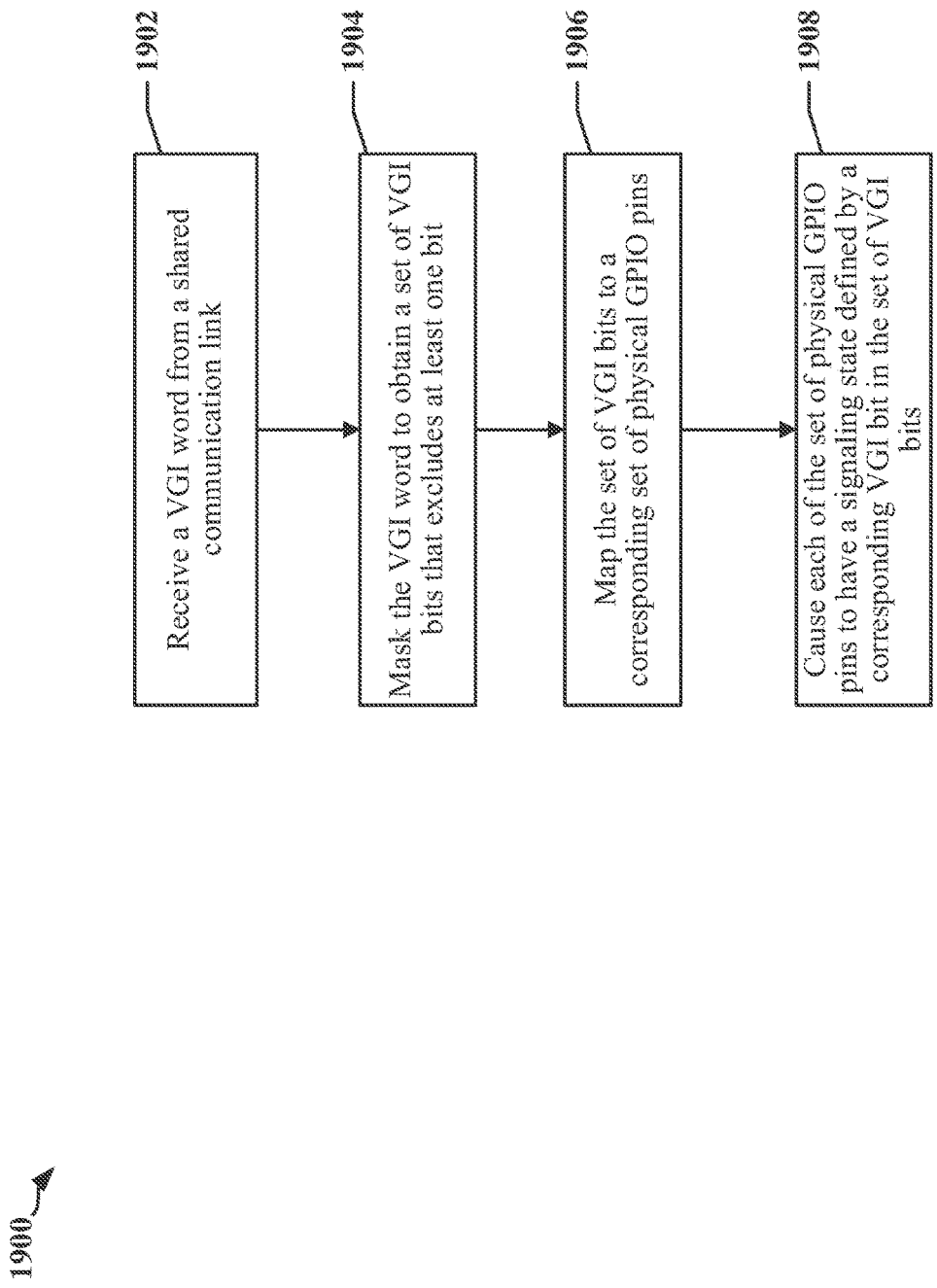
FIG. 19 is a second flowchart illustrating certain operations of an application processor adapted in accordance with certain aspects disclosed herein.

FIG. 19 is a flowchart 1900 of a method that may be performed at a receiving device. Portions of the method may be performed by a finite state machine in the transmitting device.

At block 1902, the finite state machine may receive a VGI word from a shared communication link. The VGI word may be received by a plurality of devices, where the signaling state of at least one physical GPIO pin in each of the plurality of devices is defined by a corresponding bit in the VGI word. In one example, state information defined by the VGI word includes state information associated with two or more communication links.

At block 1904, the finite state machine may mask the VGI word to obtain a set of VGI bits that excludes at least one bit. The VGI word may be masked in accordance with a masking table that identifies state information in the VGI word affecting one or more physical GPIO pins in the receiving device.

At block 1904, the finite state machine may map the set of VGI bits to a corresponding set of physical GPIO pins.

At block 1904, the finite state machine may cause each of the set of physical GPIO pins to have a signaling state defined by a corresponding VGI bit in the set of VGI bits.

The shared communication link may be operated in accordance with an SPMI protocol or an RFFE protocol.

Figure 20:
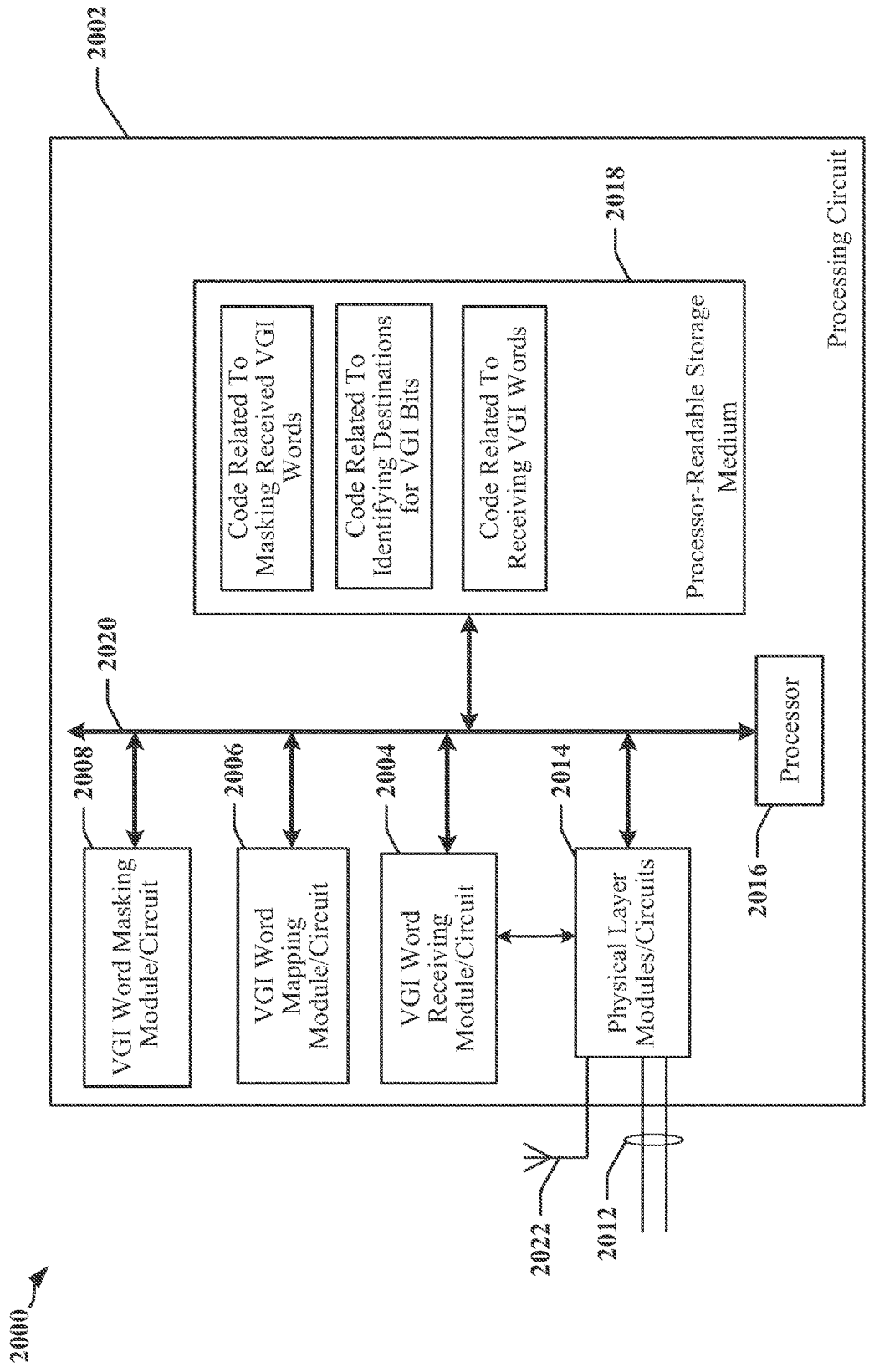
FIG. 20 illustrates a second example of a hardware implementation for an apparatus adapted in accordance with certain aspects disclosed herein.

FIG. 20 is a diagram illustrating a simplified example of a hardware implementation for an apparatus 2000 employing a processing circuit 2002. The apparatus may implement a bridging circuit in accordance with certain aspects disclosed herein. The processing circuit typically has a controller or processor 2016 that may include one or more microprocessors, microcontrollers, digital signal processors, sequencers and/or state machines. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the controller or processor 2016, the modules or circuits 2004, 2006 and 2008, and the processor-readable storage medium 2018. One or more physical layer circuits and/or modules 2014 may be provided to support communications over a communication link implemented using a multi-wire bus 2012, through an antenna 2022 (to an RF network for example), and so on. The bus 2020 may also link various other circuits such as timing sources, peripherals, voltage regulators, and power management circuits, which are well known in the art, and therefore, will not be described any further.

The processor 2016 is responsible for general processing, including the execution of software, code and/or instructions stored on the processor-readable storage medium 2018. The processor-readable storage medium may include a non-transitory storage medium. The software, when executed by the processor 2016, causes the processing circuit 2002 to perform the various functions described supra for any particular apparatus. The processor-readable storage medium may be used for storing data that is manipulated by the processor 2016 when executing software. The processing circuit 2002 further includes at least one of the modules 2004, 2006 and 2008. The modules 2004, 2006 and 2008 may be software modules running in the processor 2016, resident/stored in the processor-readable storage medium 2018, one or more hardware modules coupled to the processor 2016, or some combination thereof. The modules 2004, 2006 and 2008 may include microcontroller instructions, state machine configuration parameters, or some combination thereof.

In one configuration, the apparatus 2000 includes modules and/or circuits 2008 adapted to mask VGI words containing GPIO-state information, modules and/or circuits 2006 configured to determine one or more destinations for bits of the VGI word, and modules and/or circuits 2004 configured to receive a packet comprising the VGI word.

In one example, the apparatus 2000 has a bus interface configured to receive a VGI word from a serial bus, a masking circuit, and a VGI-FSM. The masking circuit may be configured to extract one or more VGI bits from the VGI word. The masking circuit may be configured to mask the VGI word in accordance with a masking table that identifies state information in the VGI word affecting one or more physical GPIO pins in the receiving device. State information defined by the VGI word includes state information associated with two or more communication links.

The VGI-FSM may be configured to map the one or more VGI bits to a corresponding set of physical GPIO pins, and cause each of the set of physical GPIO pins to have a signaling state defined by a corresponding VGI bit in the one or more VGI bits. The VGI word may be received by a plurality of devices, where signaling state of at least one physical GPIO pin in each of the plurality of devices is defined by a corresponding bit in the VGI word.

The serial bus may be operated in accordance with a standards-compliant or standards-compatible protocol, where the protocol may include the SPMI protocol or the RFFE protocol.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a transmitting device, comprising:
   configuring general purpose input/output (GPIO) state from a plurality of sources into a virtual GPIO (VGI) word;
   identifying one or more destinations for the VGI word based on a mapping of the GPIO state to one or more devices coupled to a shared communication link; and
   transmitting the VGI word to each destination over the shared communication link in a data packet provided in accordance with a system power management interface (SPMI) protocol or a radio frequency front-end (RFFE) protocol.

2. The method of claim 1, wherein the mapping associates each bit of the VGI word with one or more devices that includes a GPIO pin corresponding to a GPIO in a source of the each bit.

3. The method of claim 1, wherein the plurality of sources includes GPIO associated with two or more communication links.

4. The method of claim 1, wherein the plurality of sources includes GPIO associated with two or more devices.

5. The method of claim 1, wherein transmitting the VGI word comprises:
   transmitting the VGI word in a data packet provided in accordance with the SPMI protocol; and
   transmitting the data packet to a first destination through a first SPMI interface of an intermediate device, wherein the intermediate device relays the data packet to the first destination through a second SPMI interface of the intermediate device.

6. The method of claim 1, wherein each receiving device of the VGI word is configured to mask the VGI word in accordance with a masking table that identifies GPIO state information in the VGI word affecting a GPIO pin in the each receiving device.

7. The method of claim 1, wherein transmitting the VGI word comprises:
   transmitting the VGI word in a data packet provided in accordance with the RFFE protocol.

8. The method of claim 1, further comprising:
   receiving a plurality of bits, each bit representing GPIO state of one pin in a device; and
   configuring the plurality of bits using a multiplexer to form the VGI word.

9. The method of claim 1, further comprising:
   buffering one or more additional VGI words while transmitting the VGI word.

10. The method of claim 1, wherein transmitting the VGI word to each destination comprises:
    transmitting the VGI word to each destination in accordance with a standards-defined protocol that controls transmissions over the shared communication link.

11. The method of claim 1, wherein the shared communication link comprises a serial bus.

12. A method performed at a transmitting device, comprising:
configuring general purpose input/output (GPIO) state from a plurality of sources into a virtual GPIO (VGI) word;
identifying one or more destinations for the VGI word based on a mapping of the GPIO state to one or more devices coupled to a shared communication link; and
transmitting the VGI word to each destination over the shared communication link,
wherein each receiving device of the VGI word is configured to mask the VGI word in accordance with a masking table that identifies GPIO state information in the VGI word affecting a GPIO pin in the each receiving device.

13. An apparatus, comprising:
a bus interface configured to couple the apparatus to a serial bus; and
a virtual general-purpose input/output finite state machine configured to:
map general purpose input/output (GPIO) state from a plurality of sources into a virtual GPIO (VGI) word;
identify one or more destinations for the VGI word based on a mapping of the GPIO state to one or more devices coupled to the serial bus; and
transmit the VGI word in a data packet over the serial bus to at least one destination, wherein the data packet is transmitted in accordance with a system power management interface (SPMI) protocol or a radio frequency front-end (RFFE) protocol.

14. The apparatus of claim 13, wherein the plurality of sources includes GPIO associated with two or more communication links.

15. The apparatus of claim 13, wherein the plurality of sources includes GPIO associated with two or more devices.

16. The apparatus of claim 13, wherein the virtual general-purpose input/output finite state machine is further configured to:
transmit the VGI word in a data packet over the serial bus in accordance with the SPMI protocol.

17. The apparatus of claim 13, wherein the virtual general-purpose input/output finite state machine is further configured to:
transmit the VGI word in a data packet over the serial bus in accordance with the RFFE protocol.

18. The apparatus of claim 13, further comprising a mapper configured to:
associate each bit of the VGI word with one or more devices that includes a GPIO pin corresponding to a GPIO in a source of the each bit.

19. The apparatus of claim 18, wherein the mapper comprises a multiplexer configured to:
form the VGI word by configuring a plurality of bits representing GPIO state of physical pins in a device.

20. A method performed at a receiving device, comprising:
receiving a virtual general-purpose input/output (VGI) word from a shared communication link;
masking the VGI word to obtain a set of VGI bits that excludes at least one bit;
mapping the set of VGI bits to a corresponding set of physical general-purpose input/output (GPIO) pins; and
causing each of the set of physical GPIO pins to have a signaling state defined by a corresponding VGI bit in the set of VGI bits,
wherein the shared communication link is operated in accordance with a system power management interface (SPMI) protocol or a radio frequency front-end (RFFE) protocol.

21. The method of claim 20, wherein the VGI word is received by a plurality of devices, wherein signaling state of at least one physical GPIO pin in each of the plurality of devices is defined by a corresponding bit in the VGI word.

22. The method of claim 20, wherein masking the at least one bit of the VGI word comprises:
masking the VGI word in accordance with a masking table that identifies state information in the VGI word affecting one or more physical GPIO pins in the receiving device.

23. The method of claim 20, wherein state information defined by the VGI word includes state information associated with two or more communication links.

24. The method of claim 20, wherein the shared communication link is operated in accordance with the SPMI protocol.

25. The method of claim 20, wherein the shared communication link is operated in accordance with the RFFE protocol.

26. An apparatus, comprising:
a bus interface configured to receive a virtual general-purpose input/output (VGI) word from a serial bus, wherein the serial bus is operated in accordance with a system power management interface (SPMI) protocol or a radio frequency front-end (RFFE) protocol;
a masking circuit configured to extract one or more VGI bits from the VGI word; and
a virtual general-purpose input/output finite state machine configured to:
map the one or more VGI bits to a corresponding set of physical general-purpose input/output (GPIO) pins; and
cause each of the set of physical GPIO pins to have a signaling state defined by a corresponding VGI bit in the one or more VGI bits.

27. The apparatus of claim 26, wherein the VGI word is received by a plurality of devices, wherein signaling state of at least one physical GPIO pin in each of the plurality of devices is defined by a corresponding bit in the VGI word.

28. The apparatus of claim 26, wherein the masking circuit is further configured to:
mask the VGI word in accordance with a masking table that identifies state information in the VGI word affecting one or more physical GPIO pins in the apparatus.

29. The apparatus of claim 26, wherein state information defined by the VGI word includes state information associated with two or more communication links.

30. A method performed at a receiving device, comprising:
receiving a virtual general-purpose input/output (VGI) word from a shared communication link;
masking the VGI word to obtain a set of VGI bits that excludes at least one bit;
mapping the set of VGI bits to a corresponding set of physical general-purpose input/output (GPIO) pins; and
causing each of the set of physical GPIO pins to have a signaling state defined by a corresponding VGI bit in the set of VGI bits,
wherein masking the at least one bit of the VGI word comprises:

masking the VGI word in accordance with a masking table that identifies state information in the VGI word affecting one or more physical GPIO pins in the receiving device.

31. An apparatus for data communication, comprising:
a bus interface configured to receive a virtual general-purpose input/output (VGI) word from a serial bus;
a masking circuit configured to:
  extract one or more VGI bits from the VGI word; and
  mask the VGI word in accordance with a masking table that identifies state information in the VGI word affecting one or more physical GPIO pins in the apparatus; and
a virtual general-purpose input/output finite state machine configured to:
  map the one or more VGI bits to a corresponding set of physical general-purpose input/output (GPIO) pins; and
  cause each of the set of physical GPIO pins to have a signaling state defined by a corresponding VGI bit in the one or more VGI bits.

* * * * *